United States Patent
Obana et al.

(10) Patent No.: US 10,062,247 B2
(45) Date of Patent: *Aug. 28, 2018

(54) VIBRATION GENERATION SYSTEM, STORAGE MEDIUM HAVING STORED THEREIN VIBRATION GENERATION PROGRAM, AND VIBRATION GENERATION METHOD

(71) Applicant: NINTENDO CO., LTD., Kyoto (JP)

(72) Inventors: Kazutoshi Obana, Kyoto (JP); Kochi Kawai, Kyoto (JP); Junichiro Miyatake, Nagaokakyo (JP); Shoji Masubuchi, Kyoto (JP); Takafumi Aoki, Kyoto (JP); Kei Yamashita, Kyoto (JP); Masahiko Inami, Yokohama (JP); Kouta Minamizawa, Yokohama (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/431,946

(22) Filed: Feb. 14, 2017

(65) Prior Publication Data

US 2017/0154506 A1 Jun. 1, 2017

Related U.S. Application Data

(63) Continuation of application No. 14/701,903, filed on May 1, 2015, now Pat. No. 9,606,626.

(30) Foreign Application Priority Data

Jun. 10, 2014 (JP) ................................. 2014-119205

(51) Int. Cl.
*G08B 6/00* (2006.01)
*A63F 13/285* (2014.01)
(Continued)

(52) U.S. Cl.
CPC .............. *G08B 6/00* (2013.01); *A63F 13/285* (2014.09); *A63F 13/54* (2014.09); *A63F 13/92* (2014.09);
(Continued)

(58) Field of Classification Search
CPC .............. G06F 3/016; G06F 2203/013; G06F 2203/014; G06F 3/011; A63F 13/285;
(Continued)

(56) References Cited

U.S. PATENT DOCUMENTS 6,864,877 B2   3/2005 Braun et al.
2011/0053691 A1*   3/2011 Bryant .................. A63F 13/211
463/37

(Continued)

FOREIGN PATENT DOCUMENTS

JP   2003-275464   9/2003
JP   2009-061161   3/2009
JP   2013-164845   8/2013

*Primary Examiner* — Don N Vo
(74) *Attorney, Agent, or Firm* — Nixon & Vanderhye P.C.

(57) ABSTRACT

At least a first vibration output apparatus and a second vibration output apparatus used while physically separated from the first vibration output apparatus are included. The first vibration output apparatus includes a first vibration unit. The second vibration output apparatus includes a second vibration unit. It is possible to output a first vibration signal and a second vibration signal for, by changing a ratio of intensities of vibrating the first vibration unit and the second vibration unit, causing a user to perceive a single vibration source between the first vibration output apparatus and the second vibration output apparatus.

16 Claims, 11 Drawing Sheets

(51) Int. Cl.
*A63F 13/92* (2014.01)
*A63F 13/54* (2014.01)

(52) U.S. Cl.
CPC . *A63F 2300/1037* (2013.01); *A63F 2300/204* (2013.01)

(58) Field of Classification Search
CPC ............... A63F 2300/1037; A63F 13/211; A63F 13/24; A63F 13/54; A63F 13/92
USPC .................................................. 340/407, 500
See application file for complete search history.

(56) References Cited

U.S. PATENT DOCUMENTS

| | | | |
|---|---|---|---|
| 2012/0150431 A1 | 6/2012 | Ooka | |
| 2013/0207792 A1 | 8/2013 | Lim et al. | |
| 2013/0318438 A1* | 11/2013 | Afshar | G06F 3/016 715/702 |
| 2013/0342339 A1* | 12/2013 | Kiefer | G08B 6/00 340/438 |
| 2014/0056461 A1* | 2/2014 | Afshar | H04R 1/00 381/385 |

\* cited by examiner

F I G. 1
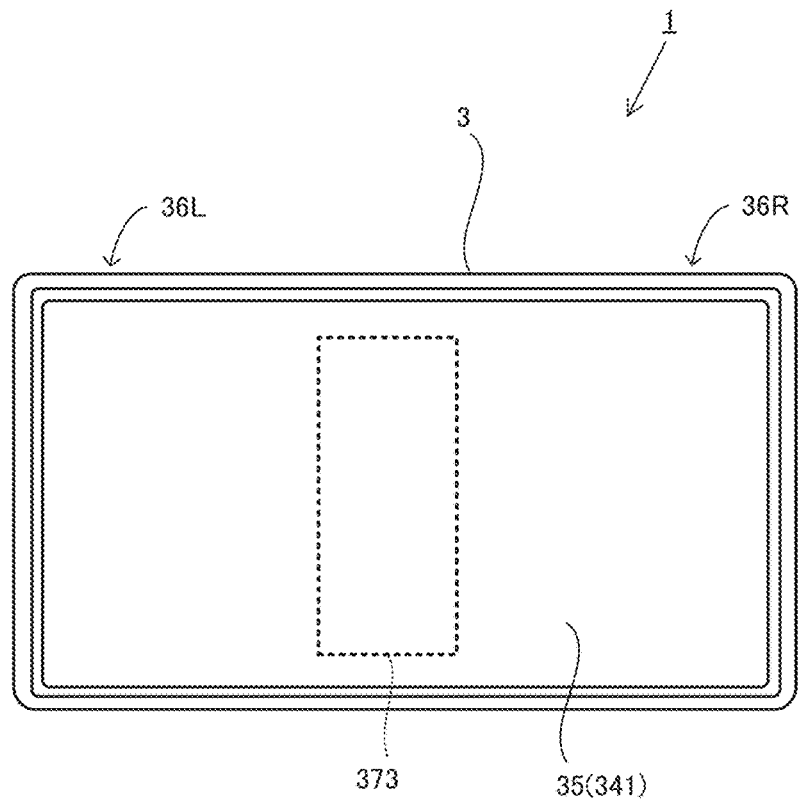
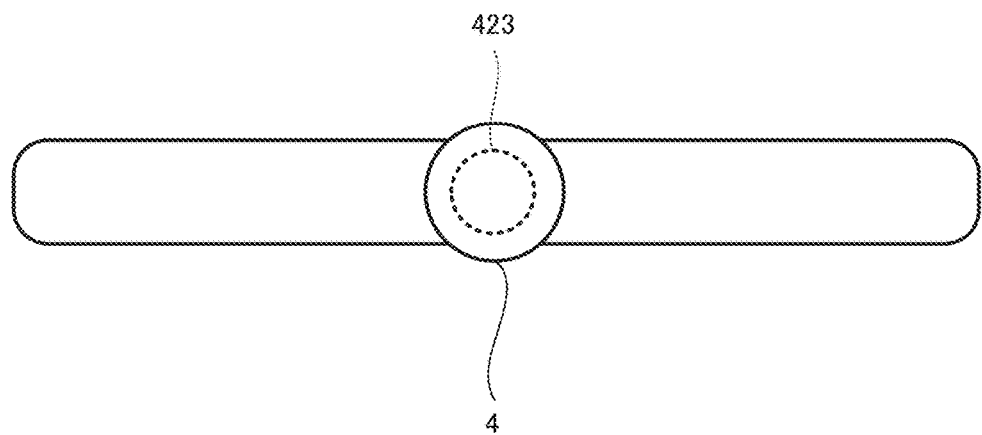

FIG. 5
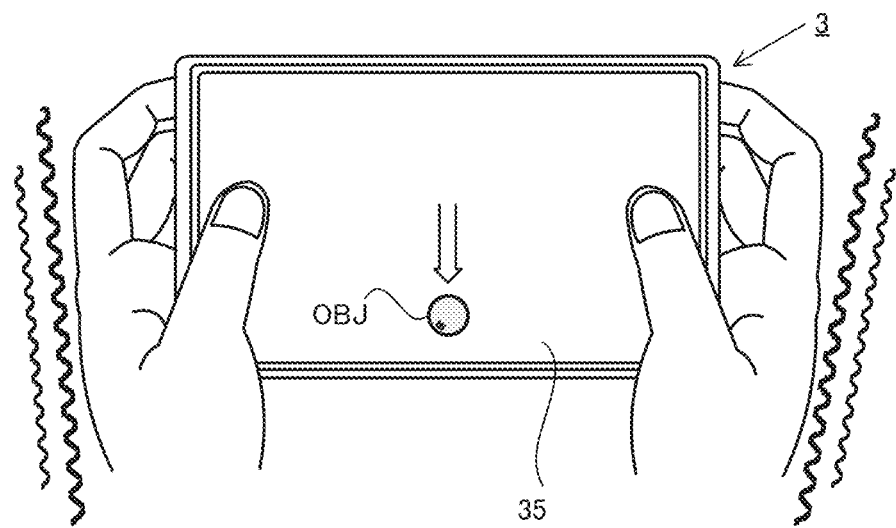
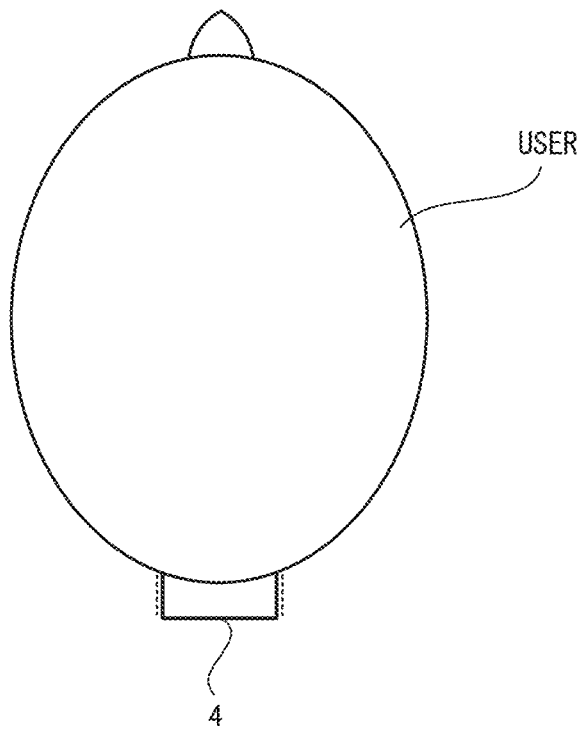

F I G. 6
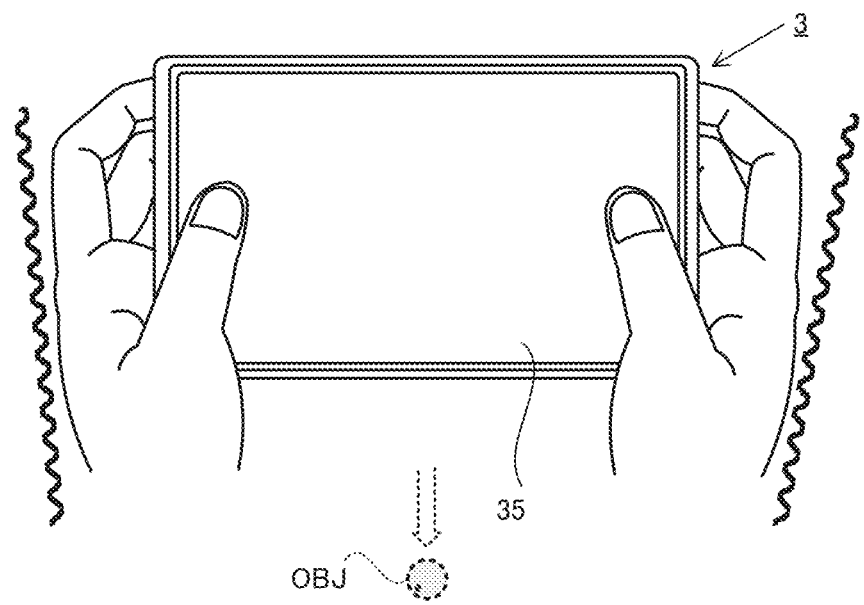
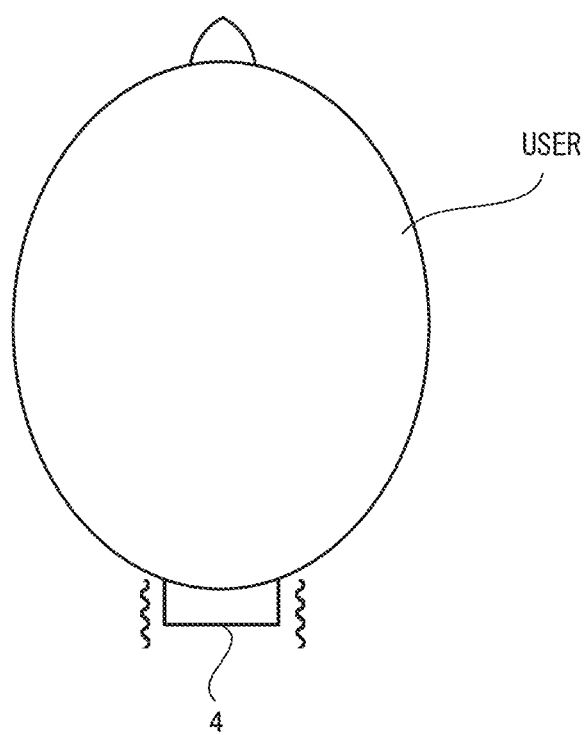

FIG. 7
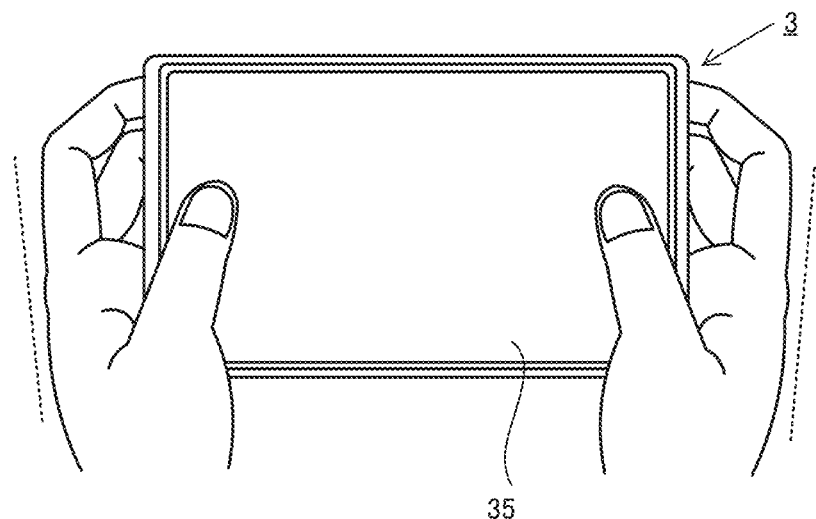
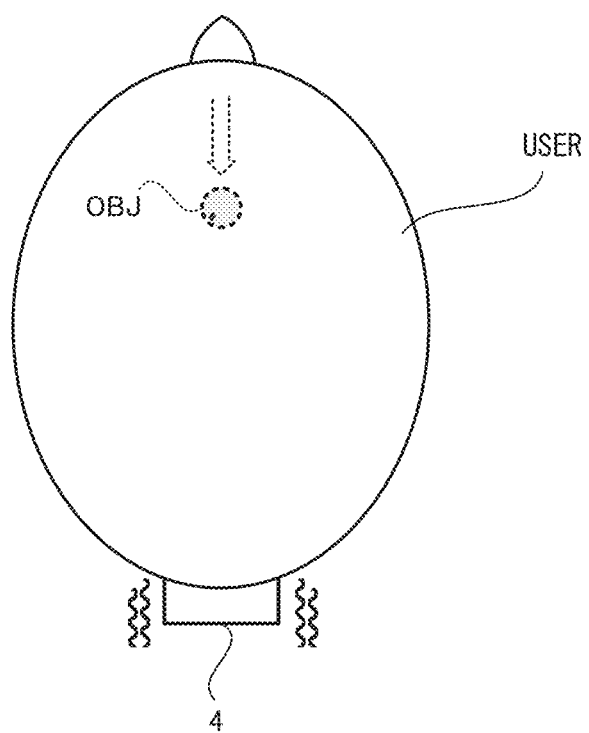

F I G. 9 A
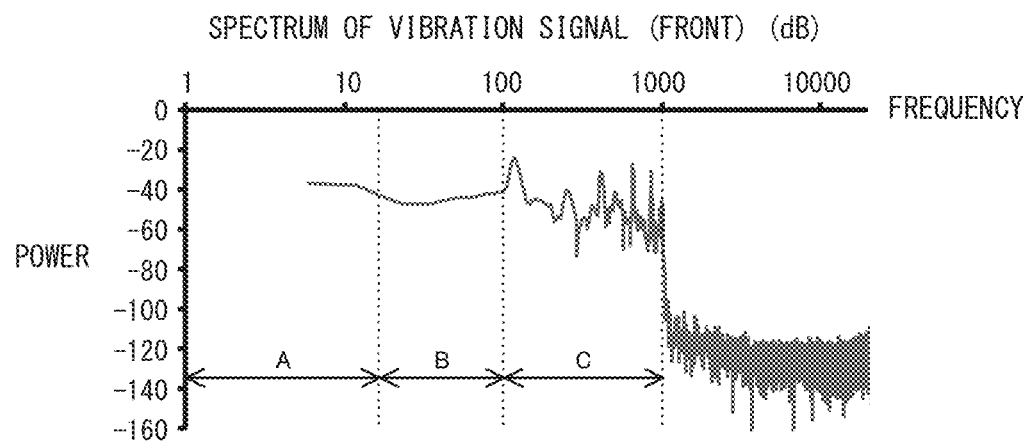
F I G. 9 B
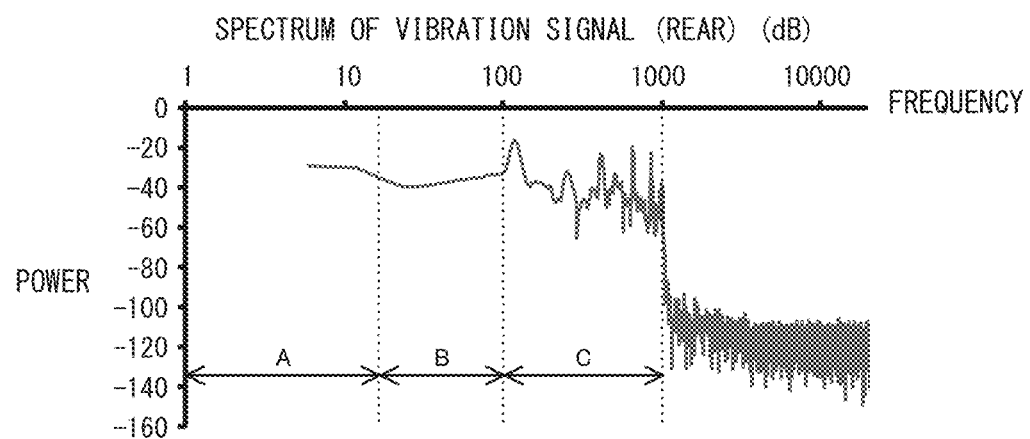

F I G. 1 1
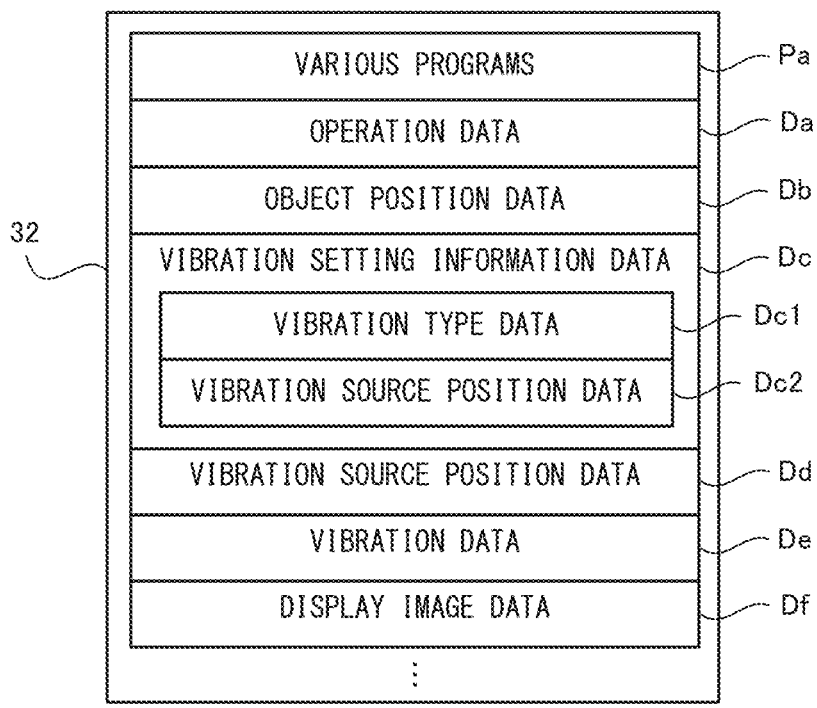

VIBRATION GENERATION SYSTEM, STORAGE MEDIUM HAVING STORED THEREIN VIBRATION GENERATION PROGRAM, AND VIBRATION GENERATION METHOD

CROSS REFERENCE TO RELATED APPLICATION

This application is a continuation of U.S. application Ser. No. 14/701,903, filed on May 1, 2015, which claims priority to Japanese Patent Application No. 2014-119205, filed on Jun. 10, 2014, the entire contents of each of which are hereby incorporated by reference.

FIELD

The technology shown here relates to a vibration generation system, a storage medium having stored therein a vibration generation program, and a vibration generation method, and in particular, relates to a vibration generation system and a vibration generation method for, for example, generating vibrations to be imparted to a user, and a storage medium having stored therein a vibration generation program for, for example, generating vibrations to be imparted to a user.

BACKGROUND AND SUMMARY

Conventionally, a game apparatus for imparting vibrations to the main body of the apparatus is known. For example, the game apparatus vibrates vibrators provided in the game apparatus, thereby transmitting vibrations to the finger and the hand of a user holding the game apparatus.

The game apparatus, however, can merely impart monotonous vibrations having their vibration sources near the vibrators to the user.

Therefore, it is an object of an exemplary embodiment to provide a vibration generation system and a vibration generation method that are capable of causing a user to perceive unconventional vibrations, and a storage medium having stored therein a vibration generation program capable of causing a user to perceive unconventional vibrations.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of a vibration generation system according to an exemplary embodiment, a vibration generation system includes at least a first vibration output apparatus and a second vibration output apparatus used while physically separated from the first vibration output apparatus. The first vibration output apparatus includes a first vibration unit. The second vibration output apparatus includes a second vibration unit. The vibration generation system includes one or more processors configured to: as first vibration control, generate and output a first vibration signal for vibrating the first vibration unit; and as second vibration control, generate and output a second vibration signal for vibrating the second vibration unit. In the first vibration control and the second vibration control, it is possible to output the first vibration signal and the second vibration signal for, by changing a ratio of intensities of vibrating the first vibration unit and the second vibration unit, causing a user to perceive a single vibration source between the first vibration output apparatus and the second vibration output apparatus.

Based on the above, it is possible to cause a user to perceive a single vibration source between a first vibration output apparatus and a second vibration output apparatus that are used while physically separated from each other. This enables the user to perceive unconventional vibrations.

In addition, in the first vibration control and the second vibration control, the first vibration unit and the second vibration unit may be simultaneously vibrated with the first vibration control and the second vibration control in conjunction with each other.

Based on the above, a plurality of vibration units are simultaneously vibrated in conjunction with each other. This enables the user to more clearly perceive the single vibration source between the first vibration output apparatus and the second vibration output apparatus.

In addition, the one or more processors may be further configured to set between the first vibration output apparatus and the second vibration output apparatus a vibration source position to be perceived as the vibration source by the user. In this case, in the first vibration control and the second vibration control, a position of the vibration source to be perceived based on the vibrations of the first vibration unit and the second vibration unit may be controlled in accordance with the vibration source position.

Based on the above, it is possible to cause the user to perceive the vibration source in accordance with a position set between the first vibration output apparatus and the second vibration output apparatus that are used while physically separated from each other.

In addition, in the setting of the vibration source position, the vibration source position may be movable between the first vibration output apparatus and the second vibration output apparatus based on a predetermined algorithm.

Based on the above, it is possible to cause the user to perceive the vibration source moving between the first vibration output apparatus and the second vibration output apparatus that are used while physically separated from each other.

In addition, in the first vibration control and the second vibration control, the first vibration unit and the second vibration unit may be simultaneously vibrated based on distribution of the intensities of the vibrations corresponding to the vibration source position, thereby causing the user to perceive the vibration source of the vibrations of the first vibration unit and the second vibration unit as being at the vibration source position.

Based on the above, the distribution of the intensities of the vibrations to be imparted to a pair of vibration units is adjusted. This makes it possible to easily set the vibration source even in the space formed between the pair of vibration units.

In addition, in the first vibration control and the second vibration control, if the vibration source position moves from a position in the first vibration output apparatus to between the first vibration output apparatus and the second vibration output apparatus, and if the vibration source position moves from a position in the second vibration output apparatus to between the first vibration output apparatus and the second vibration output apparatus, the first vibration signal and the second vibration signal may be continuously output.

Based on the above, if a vibration source position moves from a position in the first vibration output apparatus to between the first vibration output apparatus and the second vibration output apparatus, and if the vibration source position moves from a position in the second vibration output apparatus to between the first vibration output apparatus and the second vibration output apparatus, it is possible to cause the user to continuously perceive an object as the vibration source.

In addition, in the first vibration control, the first vibration signal may be generated such that as a position of the vibration source to be perceived by the user moves from the first vibration output apparatus toward the second vibration output apparatus, a vibration to be imparted by the first vibration unit is made smaller. In the second vibration control, the second vibration signal may be generated such that as a position of the vibration source to be perceived by the user moves from the first vibration output apparatus toward the second vibration output apparatus, a vibration to be imparted by the second vibration unit is made greater.

Based on the above, when the vibration source is moved from the first vibration output apparatus toward the second vibration output apparatus, it is possible to make it easy for the user to perceive the moving vibration source.

In addition, the vibration generation system may further include a sound output unit. The one or more processors may be further configured to, as sound control, generate a sound signal to be output to the sound output unit and output the generated sound signal to the sound output unit. In the first vibration control and the second vibration control, the first vibration signal and the second vibration signal may be generated so as to impart vibrations corresponding to a sound controlled in the sound control.

Based on the above, a sound corresponding to vibrations is imparted. This can provide a highly realistic experience to the user.

In addition, the vibration generation system may further include a display. The one or more processors may be further configured to, as display control, display an image corresponding to the first vibration signal and the second vibration signal on the display.

Based on the above, an image corresponding to vibrations is displayed. This can provide a more highly realistic experience to the user.

In addition, the vibration generation system may further include a display. The one or more processors may be further configured to, as display control, display an image corresponding to the first vibration signal and the second vibration signal on the display. In this case, if the vibration source position set in the setting of the vibration source position is located between the first vibration output apparatus and the second vibration output apparatus, the image displayed on the display is erased.

Based on the above, when the user is caused to perceive the vibration source between the first vibration output apparatus and the second vibration output apparatus, an image displayed so as to correspond to the vibration source is erased. This can provide a more highly realistic experience to the user.

In another exemplary configuration of the vibration generation system according to the exemplary embodiment, a vibration generation system includes a first vibration output apparatus and a second vibration output apparatus used while physically separated from the first vibration output apparatus. The first vibration output apparatus includes a first vibration unit. The second vibration output apparatus includes a second vibration unit. The first vibration output apparatus includes one or more processors configured to: as vibration control, generate and output a first vibration signal for vibrating the first vibration unit and a second vibration signal for vibrating the second vibration unit; and wirelessly transmit data representing the second vibration signal. The second vibration output apparatus includes one or more processors configured to receive the data transmitted wirelessly in the transmission of the data and output the second vibration signal indicated by the received data to the second vibration unit. In the vibration control, it is possible to output the first vibration signal and the second vibration signal for, by vibrating the first vibration unit and the second vibration unit in conjunction with each other, causing a user to perceive a single vibration source between the first vibration output apparatus and the second vibration output apparatus.

Based on the above, it is possible to cause a user to perceive a single vibration source between a first vibration output apparatus and a second vibration output apparatus that are used while physically separated from each other. This enables the user to perceive unconventional vibrations. Further, it is possible to completely separate the first vibration output apparatus and the second vibration output apparatus from each other. This makes it possible to increase the degree of freedom of the user using the first vibration output apparatus and the second vibration output apparatus.

In another exemplary configuration of the vibration generation system according to the exemplary embodiment, a vibration generation system includes at least a first vibration output apparatus that can be held in one hand of a user and a second vibration output apparatus that can be held in the other hand of the user and is used while physically separated from the first vibration output apparatus. The first vibration output apparatus includes a first vibration unit. The second vibration output apparatus includes a second vibration unit. The vibration generation system includes one or more processors configured to: as first vibration control, generate and output a first vibration signal for vibrating the first vibration unit; and as second vibration control, generate and output a second vibration signal for vibrating the second vibration unit. In the first vibration control and the second vibration control, it is possible to output the first vibration signal and the second vibration signal for, by vibrating the first vibration unit and the second vibration unit in conjunction with each other, causing a user to perceive a single vibration source between the first vibration output apparatus and the second vibration output apparatus.

Based on the above, a user holds in their hands a first vibration output apparatus and a second vibration output apparatus that are used while physically separated from each other. This enables the user to perceive a single vibration source between both hands of the user. This enables the user to perceive unconventional vibrations.

In addition, in another configuration of the vibration generation system according to the exemplary embodiment, a vibration generation system includes at least a first vibration output apparatus that can be held by a user in their hand and a second vibration output apparatus that can be attached to a neck of the user and is used while physically separated from the first vibration output apparatus. The first vibration output apparatus includes a first vibration unit. The second vibration output apparatus includes a second vibration unit. The vibration generation system includes one or more processors configured to: as first vibration control, generate and output a first vibration signal for vibrating the first vibration unit; and as second vibration control, generate and output a second vibration signal for vibrating the second vibration unit. In the first vibration control and the second vibration control, it is possible to output the first vibration signal and the second vibration signal for, by vibrating the first vibration unit and the second vibration unit in conjunction with each other, causing a user to perceive a single vibration source between the first vibration output apparatus and the second vibration output apparatus.

Based on the above, a first vibration output apparatus and a second vibration output apparatus that are used while physically separated from each other are used such that the first vibration output apparatus is held in the hand of a user and the second vibration output apparatus is attached to the neck of the user. This enables the user to perceive a single vibration source in the space between the hands and the neck of the user. This enables the user to perceive unconventional vibrations.

In addition, the exemplary embodiment may be implemented in the form of a vibration generation program or a vibration generation method.

According to the exemplary embodiment, it is possible to cause a user to perceive a single vibration source between a first vibration output apparatus and a second vibration output apparatus that are used while physically separated from each other. This enables the user to perceive unconventional vibrations.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 1 is a plan view of a non-limiting example of the external appearance of a vibration generation system 1 according to an exemplary embodiment;

FIG. 5 is a diagram showing a non-limiting example of a first stage of the state where in accordance with the display position of a moving virtual object OBJ, a vibration source to be perceived also moves;

FIG. 6 is a diagram showing a non-limiting example of a second stage of the state where in accordance with the display position of the moving virtual object OBJ, the vibration source to be perceived also moves;

FIG. 7 is a diagram showing a non-limiting example of a third stage of the state where in accordance with the display position of the moving virtual object OBJ, the vibration source to be perceived also moves;

FIG. 9A is a diagram illustrating a non-limiting example of the spectrum of a vibration imparted to the information processing apparatus 3;

FIG. 9B is a diagram illustrating a non-limiting example of the spectrum of a vibration imparted to the vibration output apparatus 4;

FIG. 11 is a diagram showing non-limiting examples of main data and programs stored in a storage section 32 of the information processing apparatus 3.

DETAILED DESCRIPTION OF NON-LIMITING EXAMPLE EMBODIMENTS

Figure 2:
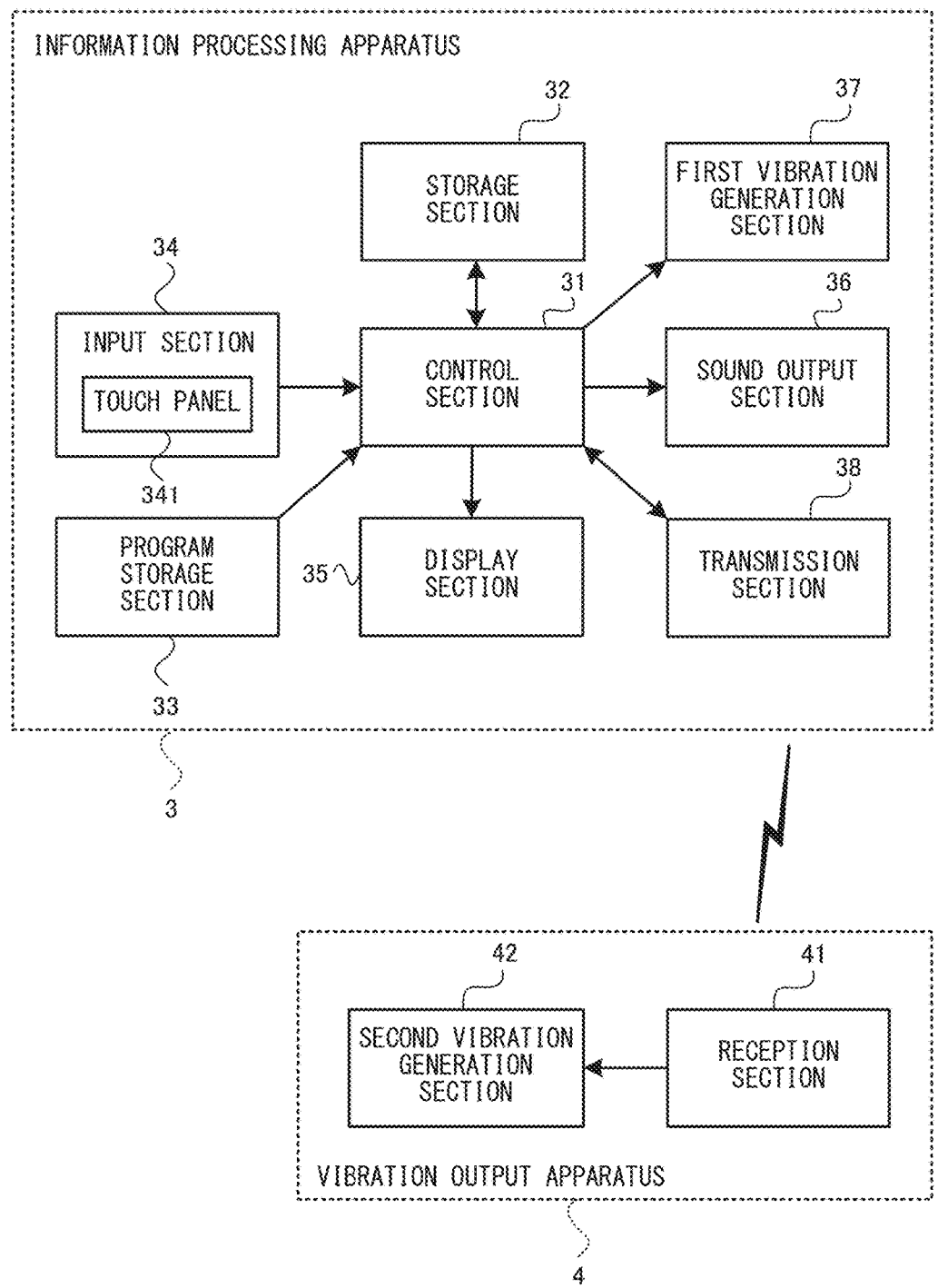
FIG. 2 is a block diagram showing non-limiting examples of the configurations of an information processing apparatus 3 and a vibration output apparatus 4.

With reference to the drawings, a vibration generation system for executing a vibration generation program according to an exemplary embodiment is described. As an example, a vibration generation system 1 includes an information processing apparatus 3 and a vibration output apparatus 4. While the vibration generation program according to the exemplary embodiment can be applied by being executed by any computer system, a mobile information processing apparatus (a tablet terminal) is used as an example of the information processing apparatus 3, and the vibration generation program according to the exemplary embodiment is described using a vibration generation program executed by the information processing apparatus 3. For example, the information processing apparatus 3 can execute a program and a pre-installed program (e.g., a game program) stored in a storage medium such as an exchangeable optical disk or an exchangeable memory card, or received from another apparatus. As an example, the information processing apparatus 3 can display on a screen an image generated by a computer graphics process, such as a virtual space image viewed from a virtual camera set in a virtual space. The information processing apparatus 3 may be a device such as a general personal computer, a stationary game apparatus, a mobile phone, a mobile game apparatus, or a PDA (Personal Digital Assistant). It should be noted that FIG. 1 is a plan view of an example of the external appearance of the vibration generation system 1, which includes the information processing apparatus 3 and the vibration output apparatus 4.

In FIG. 1, the information processing apparatus 3 includes a display section 35, a sound output section 36, and a first actuator 373. As an example, the display section 35 is provided on the front surface of the main body of the information processing apparatus 3. For example, the display section 35 includes an LCD (Liquid Crystal Display) and may employ, for example, a display device using EL. Further, the display section 35 may be a display device capable of displaying a stereoscopically viewable image.

A touch panel 341, which is an example of an input section 34, is provided so as to cover a display screen of the display section 35. The touch panel 341 detects the position of an input provided to a predetermined input surface (e.g., the display screen of the display section 35). It should be noted that the input section 34 is an input device that allows a user of the information processing apparatus 3 to input an operation, and the input section 34 may be any input device. For example, as the input section 34, an operation section such as a slide pad, an analog stick, a directional pad, an operation button, or the like may be provided on the side surfaces, the back surface, or the like of the main body of the information processing apparatus 3. Further, the input section 34 may be a sensor for detecting the orientation and the motion of the main body of the information processing apparatus 3. For example, the input section 34 may be an acceleration sensor for detecting the acceleration generated in the main body of the information processing apparatus 3, an angular velocity sensor (a gyro sensor) for detecting the amount of rotation of the main body of the information processing apparatus 3, or the like.

The sound output section 36 includes loudspeakers for outputting sounds, and in the example shown in FIG. 1, includes a pair of stereo loudspeakers (a left sound output section 36L and a right sound output section 36R) provided on the left and right of the upper side surface or the back surface of the information processing apparatus 3. The sound output section 36 performs D/A conversion on sound signals (a left sound control signal and a right sound control signal) output from a control section 31 described later, thereby generating analog sound signals (a left analog sound signal and a right analog sound signal). Then, the sound output section 36 outputs the analog sound signals to the loudspeakers (e.g., the stereo loudspeakers), thereby outputting sounds.

The first actuator 373 is a vibration actuator (a vibrator) for imparting a predetermined vibration to the main body of the information processing apparatus 3 and is included in a first vibration generation section 37 described later. In the example shown in FIG. 1, the first actuator 373 is provided near the center of the inside of the main body of the information processing apparatus 3. Specifically, as indicated by a dashed line area in FIG. 1, the first actuator 373 is provided in a central portion of the display section 35, which is a position between the left and right hands of the user when holding a left end portion of the information processing apparatus 3 in the left hand and holding a right end portion of the information processing apparatus 3 in the right hand. Further, the first vibration generation section 37 performs D/A conversion on a vibration control signal (a front vibration control signal) output from the control section 31 described later, thereby generating an analog vibration signal (a front analog vibration signal). Then, the first vibration generation section 37 outputs a driving signal obtained by amplifying the analog vibration signal to the first actuator 373, thereby driving the first actuator 373.

It should be noted that the vibration actuator for imparting a predetermined vibration to the main body of the information processing apparatus 3 may include a left actuator provided on the left side within the main body of the information processing apparatus 3, and a right actuator provided on the right side within the main body of the information processing apparatus 3. In this case, the first vibration generation section 37 performs D/A conversion on vibration control signals (a left vibration control signal and a right vibration control signal) output from the control section 31 described later, thereby generating analog vibration signals (a left analog vibration signal and a right analog vibration signal). Then, the first vibration generation section 37 outputs driving signals obtained by amplifying the analog vibration signals to the left actuator and the right actuator, thereby driving the left and right actuators.

In addition, in the exemplary embodiment, the sound output section 36 and the first actuator 373 (the first vibration generation section 37) are composed of different units disposed at different positions. Consequently, it is possible to include a unit dedicated to outputting a vibration and a unit dedicated to outputting a sound. Thus, it is possible to output a vibration and a sound more accurately than when a general-purpose unit is shared. It should be noted that a module into which a unit for outputting a vibration and a unit for outputting a sound are combined and integrated may be provided in the center of the information processing apparatus 3.

The vibration output apparatus 4 includes a housing independent of the information processing apparatus 3 and is used while physically separated from the information processing apparatus 3. As an example, the vibration output apparatus 4 includes an attachment band provided in the housing and can be attached to the neck of the user, using the attachment band (e.g., attached such that the housing is in firm contact with the back of the neck of the user).

The vibration output apparatus 4 includes a second actuator 423 within the housing. The second actuator 423 is a vibration actuator (a vibrator) for imparting a predetermined vibration to the housing of the vibration output apparatus 4 and is included in a second vibration generation section 42 described later. The second vibration generation section 42 performs D/A conversion on a vibration control signal (a rear vibration control signal) transmitted wirelessly from the information processing apparatus 3, thereby generating an analog vibration signal (a rear analog vibration signal). Then, the second vibration generation section 42 outputs a driving signal obtained by amplifying the analog vibration signal to the second actuator 423, thereby driving the second actuator 423. It should be noted that the vibration output apparatus 4 may also include a sound output section, similarly to the information processing apparatus 3. In this case, the vibration output apparatus 4 may output from the sound output section a sound corresponding to a vibration to be imparted by the second actuator 423, or as an example, may output from the sound output section a sound having a sound volume in conjunction with the magnitude of a vibration to be imparted by the second actuator 423.

Next, with reference to FIG. 2, the internal configurations of the information processing apparatus 3 and the vibration output apparatus 4 are described. It should be noted that FIG. 2 is a block diagram showing examples of the configurations of the information processing apparatus 3 and the vibration output apparatus 4.

In FIG. 2, the information processing apparatus 3 includes the control section 31, a storage section 32, a program storage section 33, and a transmission section 38 in addition to the input section 34, the display section 35, the sound output section 36, and the first vibration generation section 37, which are described above. It should be noted that the information processing apparatus 3 may be composed of one or more apparatuses including: an information processing apparatus having at least the control section 31; and another apparatus.

The control section 31 is information processing means (a computer) for performing various types of information processing and is, for example, a CPU. The control section 31 has the function of performing, as the various types of information processing, processing or the like corresponding to an operation performed on the input section 34 by the user. For example, the functions of the control section 31 are achieved by, for example, the CPU executing a predetermined program.

As the various types of information processing, the control section 31 controls the display of an image to be displayed on the display section 35. Further, as the various types of information processing, the control section 31 outputs, to the sound output section 36, sound control signals (e.g., digital sound signals) for controlling sounds to be output from the stereo loudspeakers. Further, as the various types of information processing, the control section 31 outputs to the first vibration generation section 37 a vibration control signal (e.g., a digital vibration signal) for controlling the vibration of the first actuator 373. Further, as the various types of information processing, the control section 31 outputs to the transmission section 38 a vibration control signal (e.g., a digital vibration signal) for controlling the vibration of the second actuator 423.

The storage section 32 stores various data to be used when the control section 31 performs the above information processing. The storage section 32 is, for example, a memory accessible by the CPU (the control section 31).

The program storage section 33 stores a program. The program storage section 33 may be any storage device (storage medium) accessible by the control section 31. For example, the program storage section 33 may be a storage device provided in the information processing apparatus 3 having the control section 31, or may be a storage medium detachably attached to the information processing apparatus 3 having the control section 31. Alternatively, the program storage section 33 may be a storage device (a server or the like) connected to the control section 31 via a network. The control section 31 (the CPU) may read a part or all of the program to the storage section 32 at appropriate timing and execute the read program.

The transmission section 38 wirelessly transmits data to the vibration output apparatus 4. For example, the transmission section 38 wirelessly transmits, to the vibration output apparatus 4, data representing a vibration control signal (e.g., a digital vibration signal for controlling the vibration of the second actuator 423) output from the control section 31.

The vibration output apparatus 4 includes a reception section 41 in addition to the second vibration generation section 42 described above. The reception section 41 receives data transmitted wirelessly from the transmission section 38 of the information processing apparatus 3. For example, the reception section 41 receives a vibration control signal transmitted wirelessly from the transmission section 38 and outputs the vibration control signal to the second vibration generation section 42.

Figure 3:
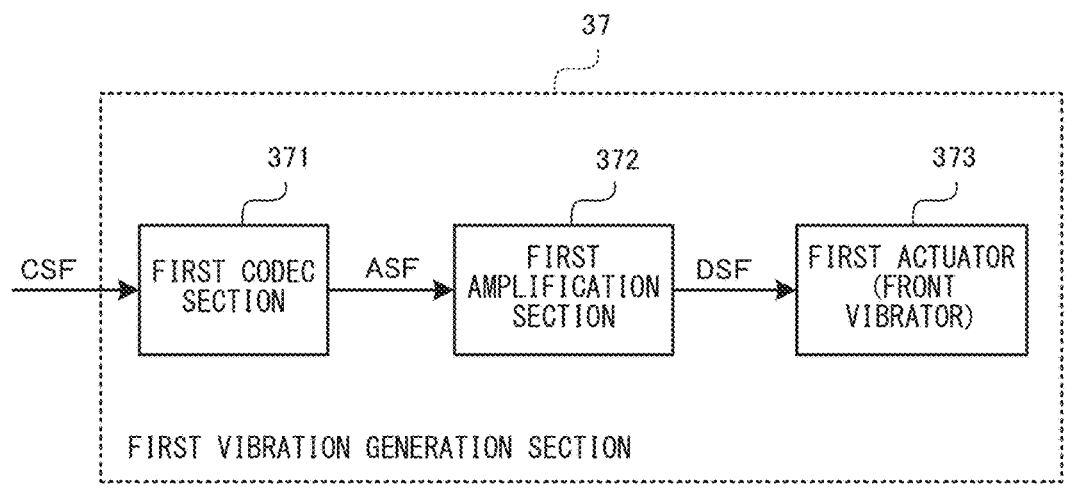
FIG. 3 is a block diagram showing a non-limiting example of the configuration of a first vibration generation section 37.

Next, with reference to FIG. 3, the configuration of the first vibration generation section 37 is described. It should be noted that FIG. 3 is a block diagram showing an example of the configuration of the first vibration generation section 37.

In FIG. 3, the first vibration generation section 37 includes a first codec section 371, a first amplification section 372, the first actuator (front vibrator) 373.

The first codec section 371 acquires a vibration control signal output from the control section 31 and performs a predetermined decoding process on the vibration control signal, thereby generating an analog vibration signal. Then, the first codec section 371 outputs the analog vibration signal to the first amplification section 372. For example, the control section 31 outputs a vibration control signal (e.g., a front vibration control signal CSF) for causing the first actuator 373 to generate a vibration. In this case, the first codec section 371 decodes the vibration control signal output from the control section 31, thereby generating an analog vibration signal (e.g., a front analog vibration signal ASF) for generating a vibration in the first actuator 373. Then, the first codec section 371 outputs the analog vibration signal to the first amplification section 372.

The first amplification section 372 amplifies the analog vibration signal output from the first codec section 371, thereby generating a driving signal for driving the first actuator 373. Then, the first amplification section 372 outputs the driving signal to the first actuator 373. For example, the first amplification section 372 increases changes in the amplitudes of the current and/or the voltage of the analog vibration signal (e.g., the front analog vibration signal ASF) output from the first codec section 371, thereby generating a driving signal (e.g., a first driving signal DSF). Then, the first amplification section 372 outputs the driving signal to the first actuator 373.

The first actuator 373 is driven in accordance with the driving signal output from the first amplification section 372, thereby imparting a vibration corresponding to the driving signal to the main body of the information processing apparatus 3. For example, as shown in FIG. 1, the first actuator 373 is provided in the center of the display screen of the display section 35. Here, the method of the first actuator 373 imparting a vibration to the main body of the information processing apparatus 3 may be any method. For example, the first actuator 373 may use the method of generating a vibration by an eccentric motor (ERM: Eccentric Rotating Mass), the method of generating a vibration by a linear vibrator (LRA: Linear Resonant Actuator), the method of generating a vibration by a piezoelectric element, or the like. If the driving signal to be output from the first amplification section 372 is generated in accordance with the method of the first actuator 373 generating a vibration, an actuator using any method can impart various vibrations to the user of the information processing apparatus 3.

It should be noted that in the above description, an example has been used where a driving signal for driving the first actuator 373 is generated by amplifying the analog vibration signal generated by the first codec section 371. Alternatively, the signal output from the first codec section 371 to the first amplification section 372 may be a digital signal. For example, if the first actuator 373 is driven by pulse width modulation (PWM) control, the first codec section 371 may generate a pulse signal for turning on and off the first actuator 373. In this case, the signal output from the first codec section 371 to the first amplification section 372 is a digital vibration signal for controlling the driving of the first actuator 373 using pulse waves. Consequently, the first amplification section 372 amplifies the digital vibration signal.

Figure 4:
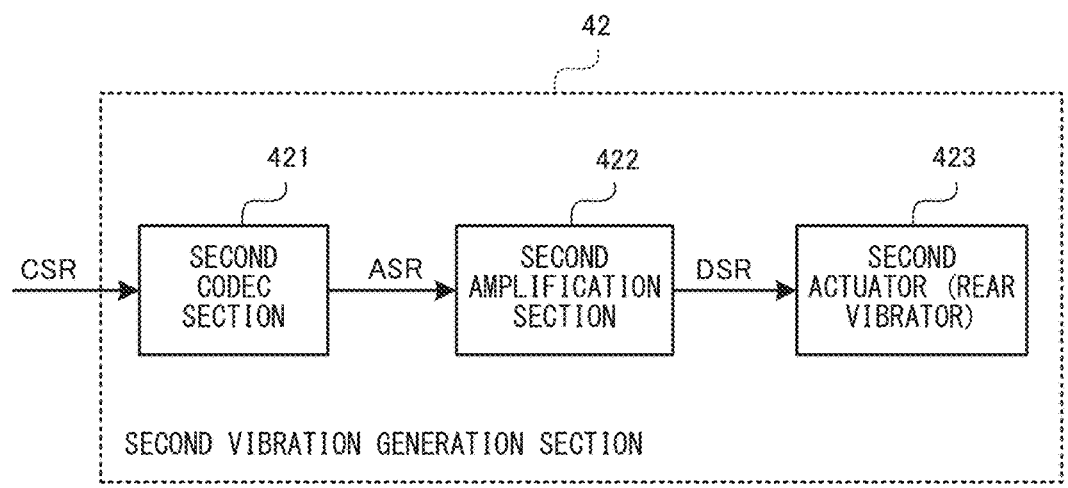
FIG. 4 is a block diagram showing a non-limiting example of the configuration of a second vibration generation section 42

Next, with reference to FIG. 4, the configuration of the second vibration generation section 42 is described. It should be noted that FIG. 4 is a block diagram showing an example of the configuration of the second vibration generation section 42.

In FIG. 4, the second vibration generation section 42 includes a second codec section 421, a second amplification section 422, and the second actuator (rear vibrator) 423.

The second codec section 421 acquires a vibration control signal received by the reception section 41 and performs a predetermined decoding process on the vibration control signal, thereby generating an analog vibration signal. Then, the second codec section 421 outputs the analog vibration signal to the second amplification section 422. For example, the reception section 41 receives, from the transmission section 38, data representing a vibration control signal (e.g., a rear vibration control signal CSR) for causing the second actuator 423 to generate a vibration and outputs the received data to the second codec section 421. In this case, the second codec section 421 decodes the vibration control signal output from the reception section 41, thereby generating an analog vibration signal (e.g., a rear analog vibration signal ASR) for generating a vibration in the second actuator 423.

Then, the second codec section 421 outputs the analog vibration signal to the second amplification section 422.

The second amplification section 422 amplifies the analog vibration signal output from the second codec section 421, thereby generating a driving signal for driving the second actuator 423. Then, the second amplification section 422 outputs the driving signal to the second actuator 423. For example, the second amplification section 422 increases changes in the amplitudes of the current and/or the voltage of the analog vibration signal (e.g., the rear analog vibration signal ASR) output from the second codec section 421, thereby generating a driving signal (e.g., a rear driving signal DSR). Then, the second amplification section 422 outputs the driving signal to the second actuator 423.

The second actuator 423 is driven in accordance with the driving signal output from the second amplification section 422, thereby imparting a vibration corresponding to the driving signal to the housing of the vibration output apparatus 4. Here, the method of the second actuator 423 imparting a vibration to the housing of the vibration output apparatus 4 may also be any method, similarly to the first actuator 373. It should be noted that in the above description, an example has been used where a driving signal for driving the second actuator 423 is generated by amplifying the analog vibration signal generated by the second codec section 421. Alternatively, the signal output from the second codec section 421 to the second amplification section 422 may be a digital signal. For example, if the second actuator 423 is driven by pulse width modulation control, the second codec section 421 may generate a pulse signal for turning on and off the second actuator 423. In this case, the signal output from the second codec section 421 to the second amplification section 422 is a digital vibration signal for controlling the driving of the second actuator 423 using pulse waves. Consequently, the second amplification section 422 amplifies the digital vibration signal.

Figure 8:
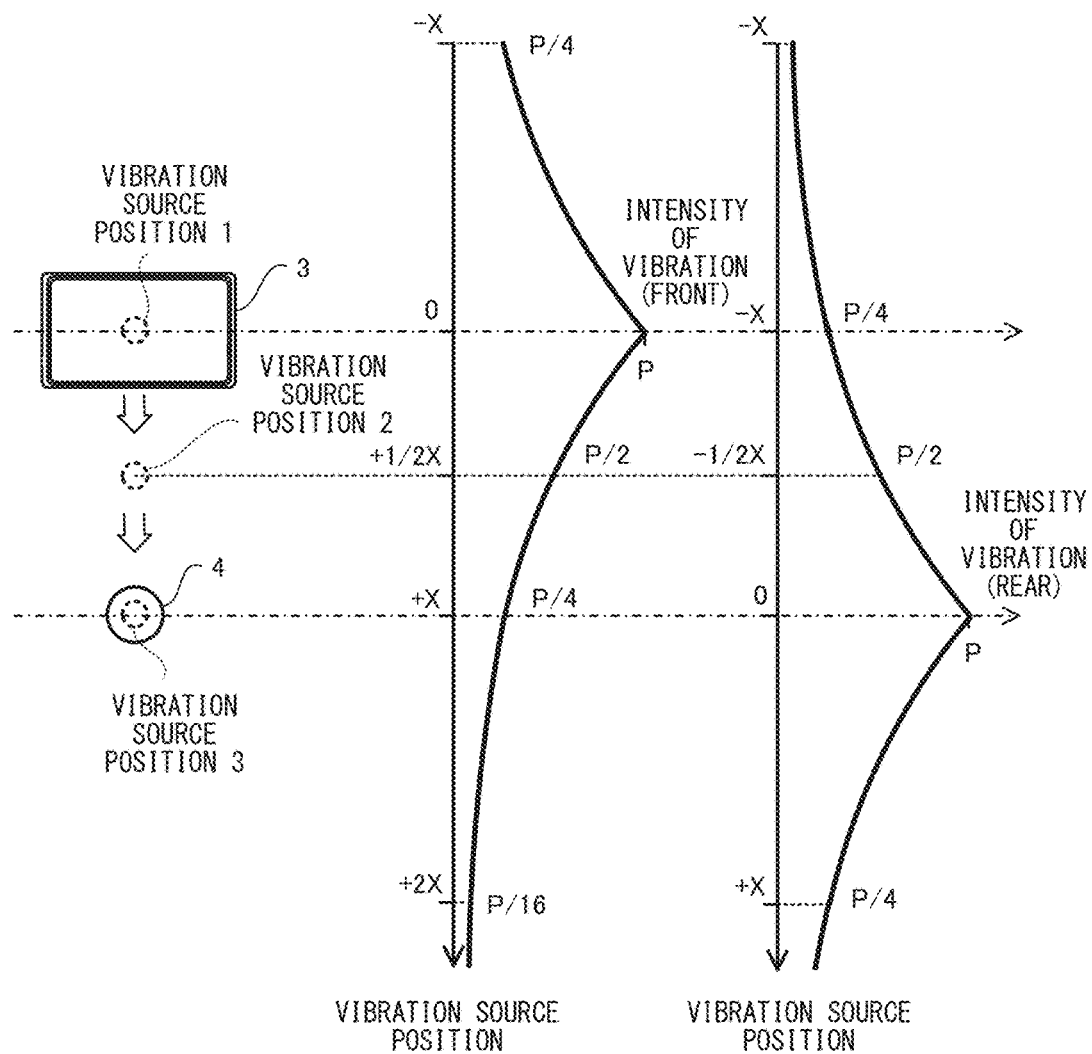
FIG. 8 is a diagram showing a non-limiting example of the intensity of a vibration imparted to the main body of the information processing apparatus 3 in accordance with the position of the vibration source to be perceived.
Figure 10A:
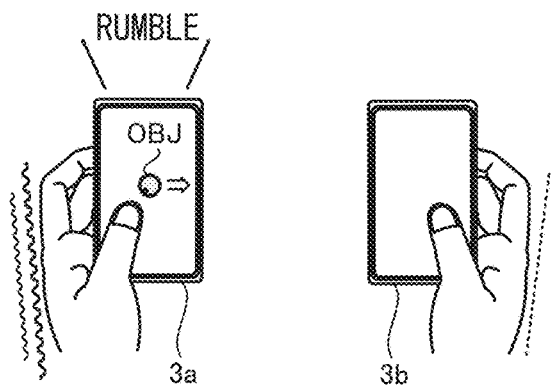
FIG. 10A is a diagram showing a non-limiting example of a first stage of the state where a vibration source to be perceived is moved using a plurality of information processing apparatuses 3.
Figure 10B:
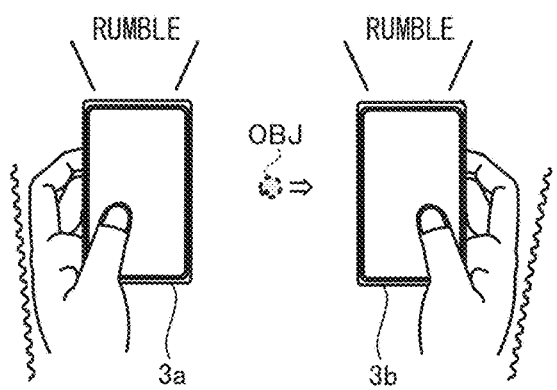
FIG. 10B is a diagram showing a non-limiting example of a second stage of the state where the vibration source to be perceived is moved using the plurality of information processing apparatuses 3.
Figure 10C:
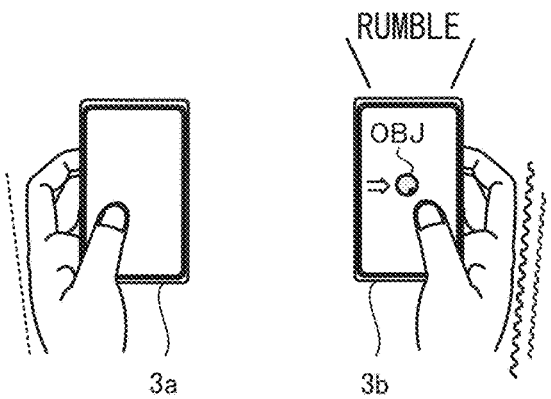
FIG. 10C is a diagram showing a non-limiting example of a third stage of the state where the vibration source to be perceived is moved using the plurality of information processing apparatuses 3.

Next, with reference to the drawings, a description is given of an overview of the processing performed by the information processing apparatus 3, before the description of specific processing performed by the information processing apparatus 3. In the following description, as an example of a vibration generation process performed by the information processing apparatus 3 and the vibration output apparatus 4, the process of performing a game where in accordance with the position of a virtual object OBJ moving inside and outside the display screen of the display section 35, a vibration source to be perceived also moves is used. It should be noted that FIG. 5 is a diagram showing an example of a first stage of the state where in accordance with the display position of a moving virtual object OBJ, a vibration source to be perceived also moves. FIG. 6 is a diagram showing an example of a second stage of the state where in accordance with the display position of the moving virtual object OBJ, the vibration source to be perceived also moves. FIG. 7 is a diagram showing an example of a third stage of the state where in accordance with the display position of the moving virtual object OBJ, the vibration source to be perceived also moves. FIG. 8 is a diagram showing an example of the intensity of a vibration imparted to the main body of the information processing apparatus 3 in accordance with the position of the vibration source to be perceived. FIG. 9A is a diagram illustrating an example of the spectrum of a vibration imparted to the information processing apparatus 3. FIG. 9B is a diagram illustrating an example of the spectrum of a vibration imparted to the vibration output apparatus 4. FIG. 10A is a diagram showing an example of a first stage of the state where a vibration source to be perceived is moved using a plurality of information processing apparatuses 3. FIG. 10B is a diagram showing an example of a second stage of the state where the vibration source to be perceived is moved using the plurality of information processing apparatuses 3. FIG. 10C is a diagram showing an example of a third stage of the state where the vibration source to be perceived is moved using the plurality of information processing apparatuses 3.

In the example shown in FIG. 5, the user holds the information processing apparatus 3 in both hands while viewing the display screen of the display section 35. Further, the user attaches the vibration output apparatus 4 to their neck and brings the housing of the vibration output apparatus 4 into firm contact with the back of the neck. In such an operation environment, a virtual object OBJ moving in a virtual world is displayed on the display screen of the display section 35. The virtual object OBJ is displayed on the display screen of the display section 35 so as to move in the virtual world in accordance with a user operation or automatically.

In accordance with the movement of the virtual object OBJ, the information processing apparatus 3 and the vibration output apparatus 4 vibrate. For example, in accordance with the display position of the virtual object OBJ displayed on the display screen of the display section 35, the first actuator 373, which is provided in the main body of the information processing apparatus 3, and the second actuator 423, which is provided in the vibration output apparatus 4, each generate a vibration to occur when the virtual object OBJ moves. As an example, with the use of phantom sensation that stimulates a plurality of points in the user's skin (both hands of the user holding the main body of the information processing apparatus 3 and the neck of the user to which the vibration output apparatus 4 is attached, in the examples of FIGS. 5 to 7) to cause the user to perceive a pseudo stimulus at one point, the first actuator 373 and the second actuator 423 impart, to the user of the vibration generation system 1, vibrations for causing the user to perceive the display position of the virtual object OBJ as the vibration source in a pseudo manner (vibrations for causing the display position of the virtual object OBJ to be the position where a pseudo force sense is presented). As described above, the display position of the virtual object OBJ and the position to be perceived as the vibration source in a pseudo manner (a pseudo force sense presentation position) are substantially matched. This can provide a realistic experience using visual sensation and tactile sensation to the user.

In the examples of FIGS. 5 to 7, the virtual object OBJ displayed on the display screen of the display section 35 moves in a direction toward below the display screen (i.e., the direction from the information processing apparatus 3 toward the vibration output apparatus 4, and the direction from the position of both hands holding the information processing apparatus 3 toward the head (neck) of the user). Further, the virtual object OBJ moves not only in the virtual world displayed on the display screen of the display section 35 but also to the virtual world outside the display screen. Then, in accordance with the movement of the virtual object OBJ, the position of the vibration source to be perceived by the user of the vibration generation system 1 also moves in the above direction.

For example, as shown in FIG. 5, if the state of the virtual object OBJ moving to below the display screen of the display section 35 in the virtual world displayed inside the display screen of the display section 35 is displayed, the vibration of the movement of the virtual object OBJ is imparted to the information processing apparatus 3 and the vibration output apparatus 4 based on the display position of the virtual object OBJ. Specifically, vibrations indicating that the virtual object OBJ is moving inside the display screen are imparted by the first actuator 373 and the second actuator 423 such that the display position of the virtual object OBJ is the position to be perceived as the vibration source in a pseudo manner. Then, if the virtual object OBJ moves from the virtual world displayed inside the display screen of the display section 35 to the virtual world below and outside the display screen, the position to be perceived as the vibration source also moves to outside the display screen of the display section 35 and toward the position where the vibration output apparatus 4 is attached, in accordance with the movement of the virtual object OBJ.

As shown in FIG. 6, if, in the virtual world that is not displayed on the display screen of the display section 35, the virtual object OBJ moves toward the position where the vibration output apparatus 4 is attached, the position where the virtual object OBJ is assumed to be moving (the position of the virtual object OBJ indicated by a dashed line in FIG. 6) with reference to the position in the virtual world displayed on the display screen is set as the position to be perceived as the vibration source. For example, in vibrations to be imparted by the first actuator 373 and the second actuator 423, the intensities of front and rear vibrations (i.e., the intensity of a vibration on the front side to be imparted by the first actuator 373 and the intensity of a vibration on the rear side to be imparted by the second actuator 423) are adjusted to achieve a predetermined balance. Simultaneously, by visual sensation indicating to the user that the virtual object OBJ has moved to outside the display screen, the user is caused to perceive as the vibration source the position of the virtual object OBJ set in the space between the information processing apparatus 3 and the vibration output apparatus 4.

Further, as shown in FIG. 7, if the virtual object OBJ moving toward the position where the vibration output apparatus 4 is attached has reached the vicinity of the attachment position of the vibration output apparatus 4, this position (the position of the virtual object OBJ indicated by a dashed line in FIG. 7) is set as the position to be perceived as the vibration source. For example, between vibrations to be imparted by the first actuator 373 and the second actuator 423, the vibration to be imparted by the second actuator 423 is adjusted to be stronger, thereby causing the user to perceive as the vibration source the position of the virtual object OBJ having moved to the vicinity of the attachment position of the vibration output apparatus 4.

In the examples of FIGS. 5 to 7, an example has been used where the position of the vibration source to be perceived by the user moves substantially parallel to the display screen of the display section 35 of the information processing apparatus 3. Alternatively, the vibration source may be moved in a direction that is not parallel to the display screen. For example, the vibration source to be perceived by the user may be moved in a direction perpendicular to the display screen of the display section 35 of the information processing apparatus 3 (the depth direction of the display screen). In this case, a form is possible in which the position of the virtual object OBJ (the vibration source to be perceived by the user) is moved in a direction perpendicular to the display screen, from the position of both hands holding the information processing apparatus 3 toward the user, and the virtual object OBJ disappears, that is, the vibration source disappears in the middle of the movement. As an example, vibrations to be imparted to the user by the vibration generation system 1 may be controlled in the following form. In the virtual space displayed on the display screen of the display section 35, the virtual object OBJ moves in a direction toward the user in the virtual space, perpendicularly to the display screen from the far side of the display screen. Then, at the time when the virtual object OBJ has reached a predetermined size, the virtual object OBJ disappears from the display screen, and vibrations that are being imparted so as to correspond to the movement of the virtual object OBJ also disappear.

As described above, a description is given of examples of the intensities of vibrations imparted by the first actuator 373 and the second actuator 423 when the position of the vibration source is moved from the information processing apparatus 3 to the attachment position of the vibration output apparatus 4 through the space between the information processing apparatus 3 and the vibration output apparatus 4. To make the description specific, a case is assumed where, as shown in FIG. 8, the vibration source to be perceived by the user moves from the information processing apparatus 3 to the attachment position of the vibration output apparatus 4 through the space between the information processing apparatus 3 and the vibration output apparatus 4 (a case where the vibration source moves along a path including a vibration source position 1, a vibration source position 2, and a vibration source position 3 in this order as shown in FIG. 8). It should be noted that the following description is given on the assumption that the distance between the center of the information processing apparatus 3 and the center of the vibration output apparatus 4 (i.e., the placement position of the first actuator 373 and the placement position of the second actuator 423) is X.

If the position of the vibration source to be perceived by the user moves along the above movement path, the intensity of the vibration imparted by the first actuator 373 is strongest at the time when the vibration source is placed at the position where the first actuator 373 is provided (i.e., a position near the center of the information processing apparatus 3) (at the time when the vibration source is placed at the position indicated by the vibration source position 1) (the peak of the intensity of the vibration is defined as a vibration intensity P). Then, when the vibration source has moved to an intermediate position between the position where the first actuator 373 is provided and the position where the second actuator 423 is provided (i.e., an intermediate position between the placement position of the information processing apparatus 3 and the attachment position of the vibration output apparatus 4; a position closer to the head of the user, at a distance X/2, from the position where the intensity of the vibration is at the peak; and the position indicated by the vibration source position 2), the intensity of the vibration imparted by the first actuator 373 is ½ of the vibration intensity P at the peak. Further, when the vibration source has moved to the position where the second actuator 423 is provided (i.e., the position where the vibration output apparatus 4 is attached; a position closer to the head of the user, at a distance X, from the position where the intensity of the vibration is at the peak; and the position indicated by the vibration source position 3), the intensity of the vibration imparted by the first actuator 373 is ¼ of the vibration intensity P at the peak. If the vibration source is moved along the above movement path, the intensity of the vibration imparted by the first actuator 373 is changed based on a function connecting these points (a function defining a curve shown in FIG. 8). As is clear from FIG. 8, the intensity of the vibration imparted by the first actuator 373 is changed based on a function of attenuating the intensity of the vibration as the vibration source moves further away toward the attachment position of the vibration output apparatus 4 from the position where the intensity of the vibration is at the peak.

If, on the other hand, the position of the vibration source to be perceived by the user moves along the above movement path, the intensity of the vibration imparted by the second actuator 423 is strongest at the time when the vibration source is placed at the position where the second actuator 423 is provided (i.e., a position near the center of the vibration output apparatus 4) (at the time when the vibration source is placed at the position indicated by the vibration source position 3) (the peak of the intensity of the vibration is defined as a vibration intensity P). Then, when the vibration source is placed at the position where the first actuator 373 is provided (i.e., the position of the information processing apparatus 3 held by the user; a position further from the user in a forward direction, at a distance X, from the position where the vibration intensity is at the peak; and the position indicated by the vibration source position 1), the intensity of the vibration imparted by the second actuator 423 is ¼ of the vibration intensity P of the peak. Then, when the vibration source has moved to an intermediate position between the position where the second actuator 423 is provided and the position where the first actuator 373 is provided (a position further from the user in the forward direction, at a distance X/2, from the position where the intensity of the vibration is at the peak; and the position indicated by vibration source position 2), the intensity of the vibration imparted by the second actuator 423 is ½ of the vibration intensity P of the peak. If the vibration source is moved along the above movement path, also the intensity of the vibration imparted by the second actuator 423 is changed based on a function connecting these points (a function defining a curve shown in FIG. 8). Further, as is clear from FIG. 8, the intensity of the vibration imparted by the second actuator 423 is changed based on a function of attenuating the intensity of the vibration as the vibration source moves further away toward the position of the information processing apparatus 3 held by the user from the position where the intensity of the vibration is at the peak.

As described above, the intensities of the vibrations imparted by the first actuator 373 and the second actuator 423 are adjusted to achieve a predetermined balance, thereby causing the user to perceive the vibration source as moving between the information processing apparatus 3 and the vibration output apparatus 4. It should be noted that the balance between the intensities of the vibrations imparted by the first actuator 373 and the second actuator 423 when the user is caused to perceive that the vibration source is present between the information processing apparatus 3 and the vibration output apparatus 4 does not need to be the above ratio. Alternatively, the above ratio may be appropriately set in accordance with the absolute values of the intensities of the vibrations to be imparted, the structure of the main body of the information processing apparatus 3, the structure of the vibration output apparatus 4, the absolute value assumed as the distance X, the distance between the display screen and the position to be perceived as the vibration source, and the like. Yet alternatively, the balance may be controlled so that one of the intensities of the vibrations imparted by the first actuator 373 and the second actuator 423 is 0.

Further, in FIG. 8, an example has been used where the intensities of the vibrations imparted by the first actuator 373 and the second actuator 423 are changed based on a function connecting the above points (an attenuation function defining a curve shown in FIG. 8). Alternatively, each of the intensities of the vibrations may be changed based on another attenuation function. For example, each of the intensities of the vibrations imparted by the first actuator 373 and the second actuator 423 may be a linear function or a quadratic function of attenuating the intensity of the vibration from the position where the intensity of the vibration is at the peak, and may be changed based on a high-dimensional function of three or more dimensions or another attenuation function. Further, control may be performed so that the vibration intensity P at the peak of the vibration imparted by each of the first actuator 373 and the second actuator 423 is generated not only at the above peak position but also when the position of the vibration source is set within a certain range from the peak position. In this case, the range where a vibration having the vibration intensity P at the peak is imparted is set to a certain range.

In addition, in the exemplary vibration control shown in FIG. 8, in order that the vibration source is perceived between a pair of actuators, the actuators are simultaneously vibrated, and simultaneously, the intensities of the vibrations are changed. Alternatively, the user may be caused to perceive the vibration source between the pair of actuators without vibrating only one of the actuators. Yet alternatively, the user may be caused to perceive the vibration source between the pair of actuators without changing the intensities of the vibrations. For example, with the use of a phenomenon termed "cutaneous rabbit" in which one of actuators is intermittently vibrated, and then, the other actuator is intermittently vibrated to cause the user to perceive the vibration source as moving by jumping between the actuators, the vibration source may be perceived between a pair of actuators.

It should be noted that as shown in FIGS. 9A and 9B, each of the first actuator 373 and the second actuator 423 imparts a vibration having a plurality of frequency components (a vibration having not only a single frequency component) to the information processing apparatus 3 and the vibration output apparatus 4. For example, FIG. 9A shows an example of the spectrum of the vibration imparted to the information processing apparatus 3 and indicates that a vibration in a frequency range having a predetermined width (a vibration in a wide band) is imparted by the first actuator 373 to the main body of the information processing apparatus 3. Further, FIG. 9B shows an example of the spectrum of the vibration imparted to the vibration output apparatus 4 and indicates that a vibration in a frequency range having a predetermined width (a vibration in a wide band) is imparted by the second actuator 423 to the vibration output apparatus 4. More specifically, a vibration having power in the entire area of the frequency range from a frequency component lower than 10 Hz (hertz) to a frequency component higher than 1 kHz (kilohertz) is imparted by each of the first actuator 373 and the second actuator 423 to the corresponding one of the information processing apparatus 3 and the vibration output apparatus 4. Here, the sensory receptors of a human being for receiving cutaneous sensation include Merkel discs, Meissner corpuscles, Pacinian corpuscles, Ruffini endings, and the like. The Merkel discs are regarded as responding to vibrations at 0 to 200 Hz. The Meissner corpuscles are regarded as responding to vibrations at 20 to 100 Hz and regarded as having the highest sensitivity to vibrations near 30 Hz. The Pacinian corpuscles are regarded as responding to vibrations at 100 to 300 Hz and regarded as having the highest sensitivity to vibrations near 200 Hz. The vibrations imparted by the first actuator 373 and the second actuator 423 to the information processing apparatus 3 and the vibration output apparatus 4 include vibrations in the frequency range of 0 to 1 kHz, which is regarded as being able to be felt by a human being or include part of vibrations in this frequency range, and also include frequency components to which these sensory receptors can respond (frequency components in areas A to C shown in FIGS. 9A and 9B). This makes it possible to reproduce a touch rich in reality and present the touch to the user.

In addition, in the exemplary embodiment, a vibration control signal (the front vibration control signal CSF) for driving the first actuator 373 and a vibration control signal (the rear vibration control signal CSR) for driving the second actuator 423 may be generated independently of each other, or may each be generated by processing a single vibration control signal. For example, in the second case, the front vibration control signal CSF and the rear vibration control signal CSR can be generated by processing a single vibration control signal prepared in advance in accordance with the intensity of the vibration for vibrating each actuator. Further, vibration data for causing the first actuator 373 to impart a vibration and vibration data for causing the second actuator 423 to impart a vibration may be prepared separately from each other. As an example, a pair of front and rear pieces of vibration data may be prepared in advance based on the position of the vibration source. Then, when vibrations are imparted to the information processing apparatus 3 and the vibration output apparatus 4, the pair of front and rear pieces of vibration data corresponding to the position of the vibration source to be perceived may be read.

In addition, in the example of the configuration of the vibration generation system 1 described above, the vibration source to be perceived by the user is moved between the information processing apparatus 3 held by the user and the vibration output apparatus 4 attached to the neck of the user. Alternatively, another configuration may be used. For example, the vibration source to be perceived by the user may be moved between an apparatus attached to the waist of the user and an apparatus attached to the foot (e.g., each foot) of the user. If apparatuses for outputting vibrations are attached to three portions in the body of the user, it is also possible to cause the user to perceive the vibration source as moving between these attachment portions one after another. For example, if apparatuses for outputting vibrations are attached to both hands and the neck of the user, it is possible to cause the user to perceive the vibration source as moving from the left hand to the left arm to the neck and then moving from the neck to the right arm to the right hand, or cause the user to perceive the vibration source as moving from the left hand to the left arm to the neck and then moving from the right hand to the right arm to the neck. Alternatively, if apparatuses for outputting vibrations are attached to the waist and both feet of the user, it is possible to cause the user to perceive the vibration source as moving from the left foot to the waist to the right foot, or cause the user to perceive the vibration source as moving from the left foot to the waist and then moving from the right foot to the waist.

In addition, it is possible to perform the above vibration control also between a plurality of information processing apparatuses including vibration actuators. For example, in another example of vibration control shown in FIGS. 10A to 10C, the vibration source to be perceived by the user can be moved between an information processing apparatus 3a and an information processing apparatus 3b (e.g., between two smartphones).

In the examples shown in FIGS. 10A to 10C, the user holds the information processing apparatus 3a in one hand and holds the information processing apparatus 3b in the other hand while viewing the display screens of both the plurality of information processing apparatuses 3a and 3b. In such an operation environment, a virtual object OBJ moving in a virtual world is displayed on the display screen of one of the information processing apparatuses, namely the information processing apparatus 3a. The virtual object OBJ is displayed so as to move in the virtual world to the display screen of the other information processing apparatus, namely the information processing apparatus 3b, in accordance with a user operation or automatically.

In accordance with the movement of the virtual object OBJ, the information processing apparatus 3a and the information processing apparatus 3b vibrate. For example, in accordance with the display position of the virtual object OBJ displayed on the display screen of the information processing apparatus 3a or the display screen of the information processing apparatus 3b, or the position of the virtual object OBJ placed in the space between the information processing apparatus 3a and the information processing apparatus 3b, the actuator provided in the main body of the information processing apparatus 3a and the actuator provided in the information processing apparatus 3b each generate a vibration to occur when the virtual object OBJ moves. As an example, with the use of phantom sensation that stimulates a plurality of points in the user's skin (both hands of the user holding the information processing apparatus 3a and the information processing apparatus 3b in the examples of FIGS. 10A to 10C) to cause the user to perceive a pseudo stimulus at one point, the actuators impart, to the user, vibrations for causing the user to perceive the placement position of the virtual object OBJ as the vibration source in a pseudo manner (vibrations for causing the placement position of the virtual object OBJ to be the position where a pseudo force sense is presented). As described above, even if the plurality of information processing apparatuses 3a and 3b are used, the position to be perceived as the vibration source in a pseudo manner (a pseudo force sense presentation position) is moved between the apparatuses. This can provide a realistic experience to the user.

In the examples of FIGS. 10A to 10C, the virtual object OBJ displayed on the display screen of the information processing apparatus 3a held in the left hand moves in a right direction (i.e., a direction toward the information processing apparatus 3b held in the left hand). Further, the virtual object OBJ moves not only in the virtual world displayed on the display screens of the information processing apparatus 3a and the information processing apparatus 3b but also to the virtual world outside the display screens. Then, in accordance with the movement of the virtual object OBJ, the position of the vibration source to be perceived by the user also moves in the above direction.

For example, as shown in FIG. 10A, if the state of the virtual object OBJ moving to the right of the display screen of the information processing apparatus 3a in the virtual world displayed inside the display screen of the information processing apparatus 3a is displayed, the vibration of the movement of the virtual object OBJ is imparted to the information processing apparatus 3a and the information processing apparatus 3b based on the display position of the virtual object OBJ. Specifically, vibrations indicating that the virtual object OBJ is moving inside the display screen are imparted by the actuator of the information processing apparatus 3a and the actuator of the information processing apparatus 3b such that the display position of the virtual object OBJ is the position to be perceived as the vibration source in a pseudo manner. Then, if the virtual object OBJ moves from the virtual world displayed inside the display screen of the information processing apparatus 3a to the virtual world to the right of and outside the display screen, the position to be perceived as the vibration source also moves to outside the display screen of the information processing apparatus 3a and toward the position where the information processing apparatus 3b is held, in accordance with the movement of the virtual object OBJ.

As shown in FIG. 10B, if, in the virtual world that is not displayed on either of the display screens of the information processing apparatus 3a and the information processing apparatus 3b and is set between the information processing apparatus 3a and the information processing apparatus 3b, the virtual object OBJ moves toward the information processing apparatus 3b, the position where the virtual object OBJ is assumed to be moving (the position of the virtual object OBJ indicated by a dashed line in FIG. 10B) with reference to the positions where the information processing apparatus 3a and the information processing apparatus 3b are held is set as the position to be perceived as the vibration source. For example, in vibrations to be imparted by both actuators, the intensities of left and right vibrations are adjusted to achieve a predetermined balance. Simultaneously, by visual sensation indicating to the user that the virtual object OBJ has moved to outside the display screen, the user is caused to perceive as the vibration source the position of the virtual object OBJ set in the space between the information processing apparatus 3a and the information processing apparatus 3b. It should be noted that the control of the intensities of the vibrations imparted by the actuators of the information processing apparatus 3a and the information processing apparatus 3b can use the above ratio of the intensities of the vibrations in the vibration generation system 1 using the information processing apparatus 3 and the vibration output apparatus 4.

Further, as shown in FIG. 10C, if the virtual object OBJ moving toward the position where the information processing apparatus 3b is held has reached the inside of the display screen of the information processing apparatus 3b, the vibrations of the movement of the virtual object OBJ are imparted to the information processing apparatus 3a and the information processing apparatus 3b based on the display position of the virtual object OBJ. For example, between vibrations to be imparted by the actuator of the information processing apparatus 3a and the actuator of the information processing apparatus 3b, the vibration to be imparted by the actuator of the information processing apparatus 3b is adjusted to be stronger, thereby causing the user to perceive as the vibration source the position of the virtual object OBJ displayed on the display screen of the information processing apparatus 3b.

It should be noted that if the vibration source is moved between a plurality of information processing apparatuses, the exemplary embodiment can be applied to various techniques other than a game and the like. For example, if data is moved from one of the information processing apparatuses to the other information processing apparatus using wireless communication, vibrations to be imparted to both information processing apparatuses can be controlled so that an icon indicating the movement of the data can be moved from the display screen of one of the information processing apparatuses to the display screen of the other information processing apparatus, and simultaneously, the position of the icon is perceived as the vibration source.

In addition, if the vibration source is moved between a plurality of information processing apparatuses, the positions where sounds to be output from the information processing apparatuses are localized may be matched with the position of the virtual object OBJ and the position of the vibration source, using sound output apparatuses provided in the respective information processing apparatuses. In this case, it is possible to impart bodily sensation richer in reality to the user, using tactile sensation based on vibrations, auditory sense based on sounds, and visual sensation for displaying a moving object.

It should be noted that vibrations and sounds that can be imparted to the user holding the information processing apparatus 3a and the information processing apparatus 3b can have different spectra. For example, each of the information processing apparatus 3a and the information processing apparatus 3b can impart, to the user, vibrations around a wide band of 0 to 1000 Hz, which is regarded as being able to be felt by a human being, and can also output sounds around a wide band of 20 to 20000 Hz, which include audio frequencies audible to the human ear. Thus, the vibrations and the sounds can have different spectra by controlling different vibrators (the first actuator 373, the second actuator 423, and the stereo loudspeakers) by different control signals.

In this case, vibration data for imparting vibrations to the information processing apparatus 3a and the information processing apparatus 3b and sound data for outputting sounds from the information processing apparatus 3a and the information processing apparatus 3b may be prepared separately in advance. Vibration data corresponding to the type of vibrations to be imparted to the information processing apparatus 3a and the information processing apparatus 3b is extracted and read from the prepared vibration data, thereby generating vibration control signals. Further, sound data corresponding to sounds to be output from the information processing apparatus 3a and the information processing apparatus 3b is extracted and read from the prepared sound data, thereby generating sound control signals. Further, sound data prepared in advance may be used as vibration data. Sound data is also data used to vibrate and drive a diaphragm of a loudspeaker and therefore can be used also as data for vibrating and driving a vibrator (i.e., vibration data). Further, sounds to be output from the sound output apparatuses of the information processing apparatus 3a and the information processing apparatus 3b (e.g., sound volumes) may be controlled using an attenuation function similar to that of the above vibration control.

In addition, if the vibration source is moved between a plurality of information processing apparatuses, data to be transmitted and received between the information processing apparatuses may not be data representing a vibration control signal. For example, in order for the plurality of information processing apparatuses to generate vibrations in conjunction with each other, one of the information processing apparatuses can wirelessly transmit information for performing vibration control to the other information processing apparatus. Specifically, one of the information processing apparatuses may transmit data representing the position of the vibration source to the other information processing apparatus. Alternatively, one of the information processing apparatuses may transmit, to the other information processing apparatus, data representing a vibration intensity based on which the other information processing apparatus generates a vibration. Yet alternatively, one of the information processing apparatuses may transmit, to the other information processing apparatus, data representing the timing of the movement of the vibration source. In any case, the other information processing apparatus generates a vibration control signal for vibrating the actuator of the other information processing apparatus itself using the received information, thereby enabling similar vibration control.

In addition, in all the above examples of vibration control, the position to be perceived as the vibration source is set in accordance with the position of the virtual object OBJ moving in the virtual world. Alternatively, the position to be perceived as the vibration source in the exemplary embodiment does not need to be the position of an image displayed so as to move. For example, the vibrations to be imparted by the respective actuators may be controlled so that a virtual object fixedly displayed on the display screen of the information processing apparatus 3 is the vibration source. Further, if an image obtained by capturing the real world is displayed on the display screen, the vibrations to be imparted by the respective actuators may be controlled so that the position of a captured object in the real world that appears in the image is the vibration source. For example, in the case of a moving image in which a captured object as the vibration source moves, the position of the captured object corresponding to the elapsed time of the reproduction of the moving image is set in advance. Then, when the moving image is reproduced, vibration control may be performed so that the position of the captured object and the position of the vibration source operate together to cause the user to perceive as the vibration source the position of the captured object set in accordance with the elapsed time of the reproduction of the moving image.

In addition, in the above vibration generation system, in order that a plurality of apparatuses used while physically separated from each other vibrate in conjunction with each other, a vibration control signal and information for vibration control are transmitted and received using wireless communication in each case. This completely separates the plurality of apparatuses from each other, and therefore increases the degree of freedom of the user using these apparatuses. This enables the user to enjoy the vibration generation system in a suitable environment. If, however, such effects are not desired, the plurality of apparatuses may be connected together in a wired manner, and a vibration control signal and information for vibration control may be exchanged through the wired connection.

In addition, in the above vibration generation system, in at least one of a plurality of apparatuses for generating vibrations, a control section for generating a vibration control signal for controlling the operation of an actuator is provided. Alternatively, it is also possible to achieve the above vibration generation system with another configuration. For example, a main body apparatus in which a control section for generating a vibration control signal is provided can be prepared aside from a plurality of apparatuses for generating vibrations, and the main body apparatus can transmit data representing a vibration control signal to each of the plurality of apparatuses in a wireless or wired manner. In this case, the plurality of apparatuses for generating vibrations may be a pair of a right handheld controller and a left handheld controller to be held by the user in both hands.

Next, a detailed description is given of the processing performed by the information processing apparatus 3 of the vibration generation system 1, which includes the information processing apparatus 3 and the vibration output apparatus 4. First, with reference to FIG. 11, main data used in the processing is described. FIG. 11 is a diagram showing examples of main data and programs stored in the storage section 32 of the information processing apparatus 3. It should be noted that in the following exemplary processing, a description is given using the vibration generation process performed when vibrations are output from the information processing apparatus 3 and the vibration output apparatus 4.

As shown in FIG. 11, the following are stored in the data storage area of the storage section 32: operation data Da; object position data Db; vibration setting information data Dc; vibration control signal data Dd; vibration data De; display image data Df; and the like. It should be noted that the storage section 32 may store, as well as the data shown in FIG. 11, data and the like necessary for the processing, such as data used in an application to be executed. Further, in the program storage area of the storage section 32, various programs Pa are stored that configure a vibration generation program. For example, the various programs Pa include a vibration generation program for generating a vibration control signal to impart a vibration to the information processing apparatus 3, an image display program for displaying an image on the display section 35, and the like.

The operation data Da is data representing the content of the operation performed on the input section 34 and includes, for example, data representing the touch position of a touch operation on the touch panel 341. It should be noted that if the input section 34 includes a sensor for detecting the orientation and the motion of the main body of the information processing apparatus 3, the operation data Da may include data for calculating the orientation and the motion of the main body of the information processing apparatus 3 (e.g., data representing the acceleration generated in the main body of the information processing apparatus 3 and data representing the angular velocity of the main body of the information processing apparatus 3).

The object position data Db is data representing the position of a virtual object OBJ moving in a virtual world.

The vibration setting information data Dc includes vibration type data Dc1, vibration source position data Dc2, and the like. The vibration type data Dc1 is data representing the type of vibrations to be imparted to the information processing apparatus 3. The vibration source position data Dc2 is data representing the position to be perceived as the vibration source by the user of the information processing apparatus 3.

The vibration control signal data Dd is data representing vibration control signals to be output from the control section 31 to the first vibration generation section 37 and the second vibration generation section 42 (the front vibration control signal CSF and the rear vibration control signal CSR; see FIGS. 3 and 4).

The vibration data De is data prepared in advance for generating a vibration control signal and is stored for each type of vibration to be imparted to the main body of the information processing apparatus 3 (e.g., for each virtual object for which a vibration is generated).

The display image data Df is data for generating an image of each virtual object such as the virtual object OBJ, a background image, and the like and displaying the generated images on the display section 35.

Figure 12:
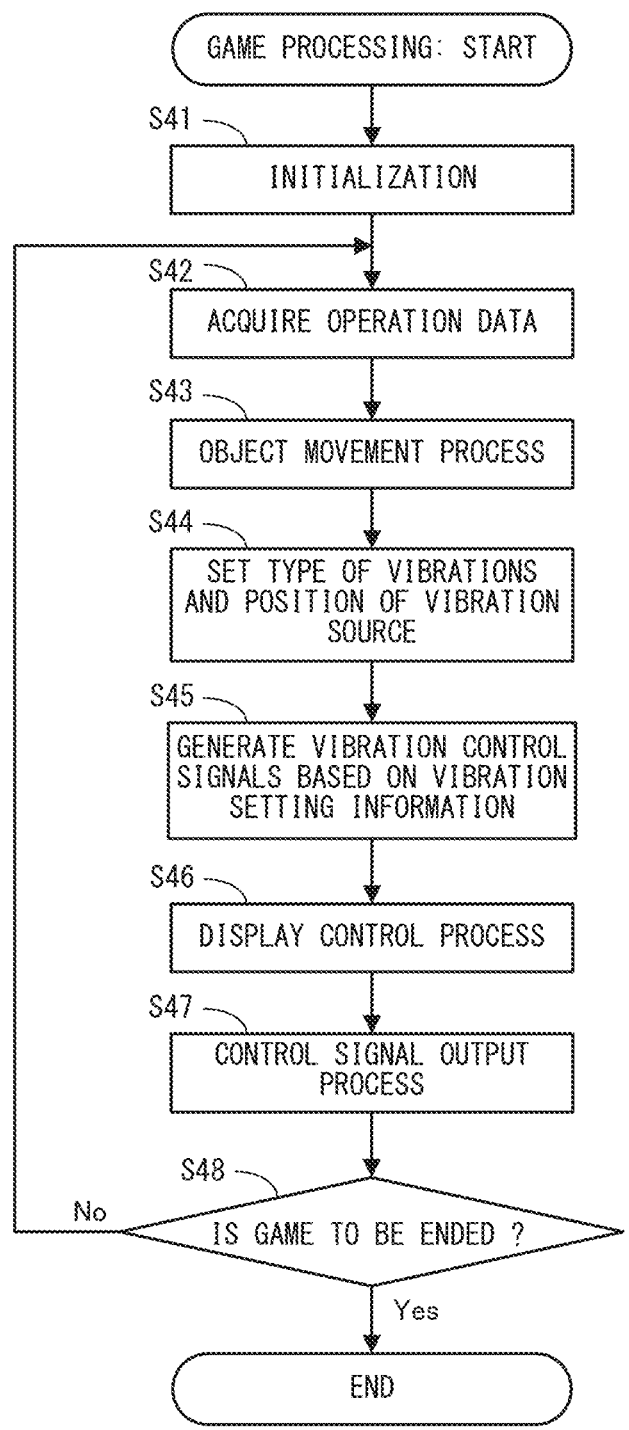
FIG. 12 is a flow chart showing a non-limiting example of game processing performed by the information processing apparatus 3.

Next, with reference to FIG. 12, a detailed description is given of game processing, which is an example of the vibration generation process performed by the information processing apparatus 3. It should be noted that FIG. 12 is a flow chart showing an example of the game processing performed by the information processing apparatus 3. Here, in the flow chart shown in FIG. 12, a description is given mainly of, in the processing performed by the information processing apparatus 3, the process of outputting vibrations corresponding to the movement of the virtual object OBJ in the virtual world. The detailed descriptions of other processes not directly related to these processes are omitted.

Further, in FIG. 12, all of the steps performed by the control section 31 are abbreviated as "S".

The CPU of the control section 31 initializes a memory and the like of the storage section 32 and loads the vibration generation program from the program storage section 33 into the memory. Then, the CPU starts the execution of the vibration generation program. The flow chart shown in FIG. 12 is a flow chart showing the processing performed after the above processes are completed.

It should be noted that the processes of all of the steps in the flow chart shown in FIG. 12 are merely illustrative. Thus, the processing order of the steps may be changed, or another process may be performed in addition to and/or instead of the processes of all of the steps, so long as similar results are obtained. Further, in the exemplary embodiment, descriptions are given on the assumption that the control section 31 (the CPU) performs the processes of all of the steps in the flow chart. Alternatively, the CPU may perform the processes of some of the steps in the flow chart, and a processor or a dedicated circuit other than the CPU may perform the processes of the other steps. Yet alternatively, a processor or a dedicated circuit other than the CPU may perform the processes of all of the steps in the flow chart.

Referring to FIG. 12, the control section 31 performs initialization (step 41), and proceeds to the next step. For example, the control section 31 constructs a virtual world to be displayed on the display section 35 and initializes parameters. As an example, the control section 31 places the virtual object OBJ at an initial position in the virtual world and sets the object position data Db. Further, the control section 31 sets the display range to be displayed on the display screen of the display section 35 for the virtual world.

Next, the control section 31 acquires operation data from the input section 34 and updates the operation data Da (step 42), and the processing proceeds to the next step.

Next, the control section 31 performs the process of causing the virtual object OBJ to move in the virtual world (step 43), and the processing proceeds to the next step. For example, the control section 31 causes the virtual object OBJ to move at a moving speed determined in advance along a movement path determined in advance in the virtual world and updates the object position data Db using the position of the virtual object OBJ after the movement. As another example, if the control section 31 causes the virtual object OBJ to move in accordance with an operation on the input section 34 (including the operation of moving or tilting the main body of the information processing apparatus 3), the control section 31 causes the virtual object OBJ to move in the virtual world in accordance with the operation data acquired in the above step 42 and updates the object position data Db using the position of the virtual object OBJ after the movement.

Next, the control section 31 sets the type of vibrations and the position of the vibration source (step 44), and the processing proceeds to the next step. For example, based on the vibration generation program and the type of the virtual object OBJ placed in the virtual world, the control section 31 sets the type of vibrations when the virtual object OBJ moves. Then, the control section 31 updates the vibration type data Dc1 using data representing the type of vibrations. Further, based on the vibration generation program, the control section 31 sets the position of the vibration source such that the position of the virtual object OBJ indicated by the object position data Db is perceived as the vibration source by the user. Then, the control section 31 updates the vibration source position data Dc2 using data representing the set position.

Next, based on vibration setting information, the control section 31 sets vibration control signals (step 45), and the processing proceeds to the next step. For example, based on the vibration generation program and the vibration setting information data Dc (the vibration type data Dc1 and the vibration source position data Dc2), the control section 31 generates vibration control signals (the front vibration control signal CSF to be output to the first vibration generation section 37 and the rear vibration control signal CSR to be transmitted to the vibration output apparatus 4; see FIGS. 3 and 4) using vibration data read from the vibration data De and stores the vibration control signals in the vibration control signal data Dd. Specifically, the control section 31 reads data from the vibration data De and generates the front vibration control signal CSF and the rear vibration control signal CSR corresponding to the vibrations of the type indicated by the vibration type data Dc1, so that the vibration of the type indicated by the vibration type data Dc1 is imparted to the main body of the information processing apparatus 3, and the position indicated by the vibration source position data Dc2 is perceived as the vibration source of the vibrations.

Next, the control section 31 performs a display control process (step 46), and the processing proceeds to the next step. For example, based on an image generation program and the object position data Db, the control section 31 performs the process of generating an image of the virtual world in which the virtual object OBJ is placed, and displaying on the display section 35 the image of the virtual world in the set display range.

Next, the control section 31 performs a control signal output process (step 47), and the processing proceeds to the next step. For example, the control section 31 outputs to the first vibration generation section 37 the front vibration control signal CSF indicated by the vibration control signal data De. Consequently, the first vibration generation section 37 generates from the first actuator 373 a vibration corresponding to the front vibration control signal CSF. Further, the control section 31 outputs to the transmission section 38 the rear vibration control signal CSR indicated by the vibration control signal data Dd and transmits data representing the rear vibration control signal CSR to the vibration output apparatus 4. Consequently, the second vibration generation section 42 of the vibration output apparatus 4 generates from the second actuator 423 a vibration corresponding to the data representing the rear vibration control signal CSR received by the reception section 41.

Next, the control section 31 determines whether or not the game processing is to be ended (step 48). Examples of conditions for ending the game processing include: the satisfaction of the condition under which the game processing is ended; and the fact that the user has performed the operation of ending the game processing. If the game processing is not to be ended, the control section 31 returns to the above step 42 and repeats the process thereof. If the game processing is to be ended, the control section 31 ends the processing indicated by the flow chart.

As described above, in the game processing according to the above exemplary embodiment, vibrations are imparted to a plurality of apparatuses used while physically separated from each other. This enables the user to perceive the vibration source between the apparatuses. This makes it possible to impart vibrations rich in variety to the user of the system. Further, in the game processing according to the above exemplary embodiment, it is possible to cause the user to perceive as the vibration source the position where the virtual object OBJ is placed in the virtual world. Further, the position of the virtual object OBJ is presented using tactile sensation based on vibrations in a wide band and visual sensation based on the display of a moving object on the display screen, whereby it is possible to impart unconventional bodily sensation rich in reality to the user.

It should be noted that the above descriptions are given using the example where the information processing apparatus 3 performs a vibration generation process (game processing). Alternatively, another apparatus may perform at least some of the processing steps in the vibration generation process. For example, if the information processing apparatus 3 is further configured to communicate with another apparatus (e.g., another server, another game apparatus, or another mobile terminal), the other apparatus may cooperate to perform the processing steps in the vibration generation process. As an example, another apparatus may perform at least one of the virtual world image generation process and the vibration control signal generation process, and the information processing apparatus 3 may acquire image data and control signals indicating the result of the process. Another apparatus may thus perform at least some of the processing steps in the vibration generation process, thereby enabling processing similar to the above vibration generation process. Further, the above vibration generation process can be performed by a processor or the cooperation of a plurality of processors, the processor or the plurality of processors included in an information processing system including at least one information processing apparatus. Further, in the above exemplary embodiment, the processing indicated in the above flow chart is performed by the control section 31 of the information processing apparatus 3 executing a predetermined vibration generation program. Alternatively, a part or all of the vibration generation process indicated in the flow chart may be performed by a dedicated circuit included in the information processing apparatus 3.

Here, the above variations make it possible to achieve the exemplary embodiment also by a system form such as so-called cloud computing, or a system form such as a distributed wide area network or a local area network. For example, in a system form such as a distributed local area network, it is possible to execute the vibration generation process between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the process of each step of the above vibration generation process. Thus, it goes without saying that it is possible to achieve the exemplary embodiment by sharing the processing in any manner.

In addition, the processing orders, the setting values, the conditions used in the determinations, and the like that are used in the above vibration generation process are merely illustrative. Thus, it goes without saying that the exemplary embodiment can be achieved also with other orders, other values, and other conditions. Further, the shapes, the number, the placement positions, the functions, and the like of the components used by the above information processing apparatus are merely illustrative, and may be other shapes, number, and placement positions. It goes without saying that the exemplary embodiment can be achieved by the information processing apparatus having other functions. As an example, three or more actuators may impart vibrations to the information processing apparatus. Alternatively, the information processing apparatus may include a plurality of display sections. Further, in the above description, a mobile apparatus (e.g., a tablet terminal or a smartphone) has been used as an example of the information processing apparatus 3. Alternatively, the information processing apparatus 3 may be a portable apparatus or a handheld apparatus larger than the mobile apparatus. Here, a portable apparatus is an apparatus that allows the movement of the main body of the apparatus when the apparatus is used, or allows a change in the orientation of the main body of the apparatus when the apparatus is used, or allows the carrying around of the main body of the apparatus, and is a concept including the above mobile apparatus. Further, a handheld apparatus is an apparatus premised on being used while held by the user in their hands when the apparatus is used, and is a concept including the above mobile apparatus.

In addition, the vibration generation program may be supplied to the information processing apparatus 3 not only through an external storage medium such as the external memory 45, but also through a wired or wireless communication link. Further, the vibration generation program may be stored in advance in a non-volatile storage device included in the information processing apparatus 3. It should be noted that examples of an information storage medium having stored therein the vibration generation program may include CD-ROMs, DVDs, optical disk storage media similar to these, flexible disks, hard disks, magneto-optical disks, and magnetic tapes, as well as non-volatile memories. Alternatively, an information storage medium having stored therein the vibration generation program may be a volatile memory for storing the vibration generation program. It can be said that such a storage medium is a storage medium readable by a computer or the like. For example, it is possible to provide the above various functions by causing a computer or the like to load a game program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as, for example, a vibration generation system, a vibration generation program, a vibration generation method, and the like in order, for example, to impart vibrations rich in variety to a user.

What is claimed is:

1. A vibration generation system including at least a main body apparatus, a first controller and a second controller used while physically separated from the first controller,
the first controller including a first vibrator,
the second controller including a second vibrator,
the main body apparatus comprising one or more processors configured to:
as first vibration control, generate and output a first vibration signal for vibrating the first vibrator; and
as second vibration control, generate and output a second vibration signal for vibrating the second vibrator, wherein
in the first vibration control and the second vibration control, the one or more processors generates and outputs the first vibration signal and the second vibration signal such that a ratio of intensities of vibrating the first vibrator and the second vibrator changes, thus causing a user to perceive movement of data transmitted between the first and the second controller.

2. The vibration generation system according to claim 1, wherein
the main body apparatus transmits data representing the first vibration signal and the second vibration signal to the first controller and the second controller, respectively, wirelessly.

3. The vibration generation system according to claim 1, wherein
each of the first and second controllers is a handheld controller.

4. The vibration generation system according to claim 3, wherein
the first controller is held by the right hand of a user and the second controller is held by the left hand of the user.

5. The vibration generation system according to claim 1, wherein
at least one of the first vibrator and the second vibrator is a linear vibrator.

6. The vibration generation system according to claim 1, wherein
in the first vibration control and the second vibration control, the first vibrator and the second vibrator are simultaneously vibrated in conjunction with each other.

7. The vibration generation system according to claim 1, wherein
in the first vibration control, the first vibration signal is generated such that a vibration to be imparted by the first vibrator is made smaller, and
in the second vibration control, the second vibration signal is generated such that a vibration to be imparted by the second vibrator is made greater.

8. The vibration generation system according to claim 1, further comprising a sound outputter, wherein
the one or more processors are further configured to, as sound control, generate a sound signal to be output to the sound outputter and output the generated sound signal to the sound outputter, and
in the first vibration control and the second vibration control, the first vibration signal and the second vibration signal are generated so as to impart vibrations corresponding to a sound controlled in the sound control.

9. The vibration generation system according to claim 1, further comprising a display, wherein the one or more processors are further configured to, as display control, display an image, corresponding to the first vibration signal and the second vibration signal, on the display.

10. The vibrating generation system according to claim 9, wherein
the image includes an image representing a movable virtual object.

11. The vibrating generation system according to claim 9, wherein
the image includes an image representing a virtual object in a virtual space.

12. The vibration generation system according to claim 1, wherein
the one or more processors are further configured to set between the first controller and the second controller a vibration source position to be perceived as a vibration source by the user, and
in the first vibration control and the second vibration control, a position of the vibration source to be perceived based on the vibrations of the first controller and the second controller is controlled in accordance with the vibration source position.

13. The vibration generation system according to claim 12, wherein
in the first vibration control and the second vibration control, the first vibrator and the second vibrator are simultaneously vibrated based on distribution of the intensities of the vibrations corresponding to the vibration source position, thereby causing the user to perceive the vibration source of the vibrations of the first vibrator and the second vibrator as being at the vibration source position.

14. The vibration generation system according to claim 12, wherein
in the first vibration control and the second vibration control, if the vibration source position moves from a position in the first controller to between the first controller and the second controller, and if the vibration source position moves from a position in the second controller to between the first controller and the second controller, the first vibration signal and the second vibration signal are continuously output.

15. A non-transitory computer-readable storage medium having stored therein a vibration generation program executed by a computer included in a vibration generation system including a main body apparatus, a first controller including a first vibrator and a second controller including a second vibrator, the second controller used while physically separated from the first controller, the vibration generation program causing the computer to execute:
generating and outputting a first vibration signal for vibrating the first vibrator; and
generating and outputting a second vibration signal for vibrating the second vibrator, wherein
in the generation and output of the first vibration signal and the second vibration signal, the computer generates and outputs the first vibration signal and the second vibration signal such that a ratio of intensities of vibrating the first vibrator and the second vibrator changes, thus causing a user to perceive movement of data transmitted between the first and the second controller.

16. A vibration generation method performed by a processor or cooperation of a plurality of processors, the processor or the plurality of processors included in a vibration generation system including a main body apparatus, a first controller including a first vibrator and a second controller including a second vibrator, the second controller used while physically separated from the first controller, the vibration generation method comprising:
  generating and outputting a first vibration signal for vibrating the first vibrator; and
  generating and outputting a second vibration signal for vibrating the second vibrator, wherein
  in the generation and output of the first vibration signal and the second vibration signal, the processor or the plurality of processors generates and outputs the first vibration signal and the second vibration signal such that a ratio of intensities of vibrating the first vibrator and the second vibrator changes, thus causing a user to perceive movement of data transmitted between the first and the second controller.

* * * * *